United States Patent
Seno et al.

(10) Patent No.: US 11,384,231 B2
(45) Date of Patent: Jul. 12, 2022

(54) PROPYLENE POLYMER COMPOSITION

(71) Applicant: SUMITOMO CHEMICAL COMPANY, LIMITED, Tokyo (JP)

(72) Inventors: Kenichi Seno, Chiba (JP); Yohei Kashiwame, Chiba (JP); Kazuya Inoue, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/254,698

(22) PCT Filed: Jul. 2, 2019

(86) PCT No.: PCT/JP2019/026229
§ 371 (c)(1),
(2) Date: Dec. 21, 2020

(87) PCT Pub. No.: WO2020/009090
PCT Pub. Date: Jan. 9, 2020

(65) Prior Publication Data
US 2021/0115234 A1  Apr. 22, 2021

(30) Foreign Application Priority Data
Jul. 5, 2018  (JP) .............................. JP2018-128120

(51) Int. Cl.
*C08L 23/12* (2006.01)
*C08L 23/08* (2006.01)
(Continued)

(52) U.S. Cl.
CPC ........... *C08L 23/12* (2013.01); *C08L 23/0815* (2013.01); *C08L 23/16* (2013.01); *C08L 51/003* (2013.01); *C08L 53/00* (2013.01); *C08K 3/013* (2018.01)

(58) Field of Classification Search
CPC .......... C08L 23/12; C08L 23/14; C08L 23/16; C08L 51/06; C08L 53/00; C08L 2207/02
See application file for complete search history.

(56) References Cited

U.S. PATENT DOCUMENTS

| 6,897,261 B1 | 5/2005 | Machida et al. |
| 10,662,322 B2 * | 5/2020 | Inoue ...................... C08L 23/16 |

(Continued)

FOREIGN PATENT DOCUMENTS

| JP | S63-205342 | 8/1988 |
| JP | H10-338704 | 12/1998 |

(Continued)

OTHER PUBLICATIONS

International Search Report and Written Opinion in PCT/JP2019/026229, dated Sep. 18, 2019. 8 pages.

(Continued)

*Primary Examiner* — Mark S Kaucher
(74) *Attorney, Agent, or Firm* — Meunier Carlin & Curfman LLC

(57) ABSTRACT

Provided is a propylene polymer composition capable of implementing a molded article containing excellent impact resistance.
Provided is a propylene polymer composition containing components (A) to (C), satisfying all of requirements (1) to (5),
(A) a propylene polymer containing 90 wt % or more of a propylene structural unit;
(B) an ethylene-α-olefin copolymer or hydrogenated conjugated diene polymer containing more than 10 wt % and 99 wt % or less of an ethylene structural unit;
(C) a propylene block copolymer or graft copolymer containing a propylene polymer segment and an ethylene-α-olefin copolymer segment or a hydrogenated conjugated diene polymer segment;

(Continued)

(1) an intrinsic viscosity being 0.5 dl/g or more;
(2) CXIS having a number average molecular weight of 40,000 or more;
(3) a ratio of the number average molecular weight of CXIS to a number average molecular weight of CXS being 0.5 or more and 20 or less;
(4) CXS having the number average molecular weight of 120,000 or less; and
(5) a content of ash being 1 to 5,000 wt. ppm.

13 Claims, 1 Drawing Sheet

(51) Int. Cl.
    *C08L 23/16*     (2006.01)
    *C08L 51/00*     (2006.01)
    *C08L 53/00*     (2006.01)
    *C08K 3/013*     (2018.01)

(56) References Cited

U.S. PATENT DOCUMENTS

| | | |
|---|---|---|
| 2003/0208024 A1 | 11/2003 | Tatsumi et al. |
| 2004/0176520 A1 | 9/2004 | Machida et al. |
| 2010/0168323 A1 | 7/2010 | Ito et al. |
| 2011/0034645 A1* | 2/2011 | Standaert .................. C08J 5/18 526/351 |
| 2012/0208946 A1* | 8/2012 | Shan ....................... C08L 23/10 524/505 |
| 2017/0081509 A1 | 3/2017 | Itakura et al. |
| 2017/0096514 A1 | 4/2017 | Yanagimoto et al. |
| 2019/0161605 A1 | 5/2019 | Yamada |
| 2020/0181297 A1 | 6/2020 | Arakawa et al. |

FOREIGN PATENT DOCUMENTS

| | | | |
|---|---|---|---|
| JP | 2004-35769 | 2/2004 | |
| JP | 2004-143434 | 5/2004 | |
| JP | 2004-143435 | 5/2004 | |
| JP | 2004-143436 | 5/2004 | |
| JP | 2004-143437 | 5/2004 | |
| JP | 2008-144152 | 6/2008 | |
| JP | 200996820 A | 5/2009 | |
| JP | 2009096820 A * | 5/2009 | ........... B29C 47/766 |
| JP | 2010-24398 | 2/2010 | |
| JP | 2010-116498 | 5/2010 | |
| JP | 2013-151580 | 8/2013 | |
| JP | 2017-57315 | 3/2017 | |
| JP | 2017-57316 | 3/2017 | |
| JP | 2017-57317 | 3/2017 | |
| JP | 2017-57318 | 3/2017 | |
| JP | 2017-57319 | 3/2017 | |
| JP | 2017-57320 | 3/2017 | |
| JP | 201757320 A | 3/2017 | |
| JP | 2017-66200 | 4/2017 | |
| JP | 2017-66201 | 4/2017 | |
| JP | 2017-88893 | 5/2017 | |
| WO | 01/07493 | 2/2001 | |
| WO | 03/008497 | 1/2003 | |
| WO | 2015147187 | 10/2015 | |
| WO | 201693266 | 6/2016 | |
| WO | 2017055724 | 4/2017 | |
| WO | 2018025863 A1 | 2/2018 | |
| WO | 2018025864 A1 | 2/2018 | |

OTHER PUBLICATIONS

New Edition Polypropylene Handbook, Nello Pasquini, Kogyo Shimbun, Ltd., 2012, p. 379 to 383, English Translation included.

\* cited by examiner

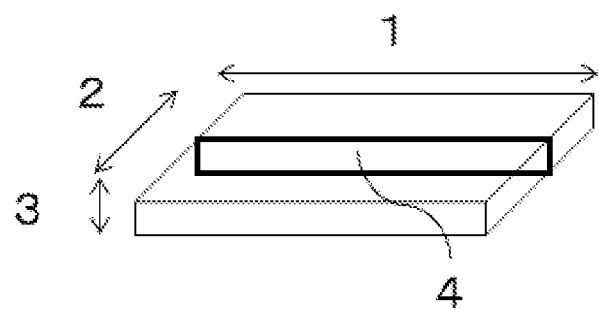

PROPYLENE POLYMER COMPOSITION

CROSS REFERENCE TO RELATED APPLICATIONS

This application is a United States National Phase Patent Application of International Patent Application Number PCT/JP2019/026229, filed on Jul. 2, 2019, which claims the benefit of priority to JP Application No. 2018-128120, filed Jul. 5, 2018, which are incorporated by reference herein in their entirety.

TECHNICAL FIELD

The present invention relates to a propylene polymer composition.

BACKGROUND ART

A molded article containing crystalline polypropylene has been widely used for a vehicle material or a home electronics material.

In order to improve impact resistance of a molded article, a resin composition containing crystalline polypropylene and an elastomer component is generally used. Examples of the resin composition can include a heterophasic propylene polymer material containing a propylene polymer component and an elastomer component obtained by multi-stage polymerization (for example, see Non-Patent Document 1) and a composition obtained by kneading a propylene polymer and an elastomer by a kneader (for example, see Patent Document 1).

PRIOR ART DOCUMENTS

Patent Document

Patent Document 1: JP-A-2013-151580

Non-Patent Document

Non-Patent Document 1: New Edition Polypropylene Handbook, Nello Pasquini, Kogyo Shimbun, Ltd., 2012, p. 379 to 383

SUMMARY OF THE INVENTION

Problems to be Solved by the Invention

However, impact resistance of a molded article containing the resin composition has not been sufficient. In consideration of this circumstance, the problem to be solved by the present invention is to provide a propylene polymer composition capable of implementing a molded article having excellent impact resistance.

Means for Solving the Problems

The present invention provides the followings. [1] A propylene polymer composition containing the following components (A), (B) and (C), satisfying all of the following requirements (1) to (5), Component (A): a propylene polymer containing a structural unit derived from propylene in an amount of 90 wt % or more with respect to a total weight of 100 wt % of the propylene polymer;

Component (B): at least one polymer selected from the group consisting of an ethylene-α-olefin copolymer and a hydrogenated conjugated diene polymer, in which the ethylene-α-olefin copolymer is a copolymer containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer;

Component (C): a propylene block copolymer or graft copolymer containing the following segment (I) and the following segment (II), Segment (I): a propylene polymer segment containing a structural unit derived from propylene in an amount of 90 wt % or more with respect to a total weight of 100 wt % of the propylene polymer segment; and Segment (II): at least one segment selected from the group consisting of an ethylene-α-olefin copolymer segment and a hydrogenated conjugated diene polymer segment, in which the ethylene-α-olefin copolymer segment is a segment containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer segment;

Requirement (1): an intrinsic viscosity of the propylene polymer composition is 0.5 dl/g or more;

Requirement (2): at least one of a number average molecular weight in terms of polystyrene of the following CXIS and a number average molecular weight in terms of polystyrene of the following CHIS is 40,000 or more, CXIS: a component insoluble in p-xylene at 25° C. in the propylene polymer composition; and CHIS: a component insoluble in n-heptane at 25° C. in the propylene polymer composition;

Requirement (3): at least one of a ratio of the number average molecular weight in terms of the polystyrene of the CXIS to a number average molecular weight in terms of polystyrene of the following CXS and a ratio of the number average molecular weight in terms of the polystyrene of the CHIS to a number average molecular weight in terms of polystyrene of the following CHS is 0.5 or more and 20 or less, CXS: a component dissolved in p-xylene at 25° C. in the propylene polymer composition; and CHS: a component dissolved in n-heptane at 25° C. in the propylene polymer composition;

Requirement (4): at least one of the number average molecular weight in terms of the polystyrene of the CXS and the number average molecular weight in terms of the polystyrene of the CHS is 120,000 or less; and Requirement (5): a content of ash in the propylene polymer composition is 1 to 5,000 wt. ppm.

[2] The propylene polymer composition according to [1], in which a content of the component (C) is 10 wt % or more with respect to a total weight of 100 wt % of the propylene polymer composition.

[3] The propylene polymer composition according to [1] or [2], in which the component (B) is an ethylene-propylene copolymer, and the segment (II) of the component (C) is an ethylene-propylene copolymer segment.

[4] The propylene polymer composition according to [1] or [2], in which the component (B) is an ethylene-α-olefin copolymer containing a structural unit derived from ethylene and a structural unit derived from an α-olefin having 4 to 10 carbon atoms, the segment (II) of the component (C) is an ethylene-α-olefin copolymer segment containing a structural unit derived from ethylene and a structural unit derived from an α-olefin having 4 to 10 carbon atoms, a number of short chain branches per 1,000 total carbon atoms of the ethylene-α-olefin copolymer is 10 to 200, and a number of short chain branches per 1,000 total carbon atoms of the ethylene-α-olefin copolymer segment is 10 to 200.

[5] The propylene polymer composition according to [1] or [2], in which the component (B) is a hydrogenated conjugated diene polymer, the segment (II) of the component (C) is a hydrogenated conjugated diene polymer segment, a number of short chain branches per 1,000 total carbon atoms of the hydrogenated conjugated diene polymer is 10 to 200, and a number of short chain branches per 1,000 total carbon atoms of the hydrogenated conjugated diene polymer segment is 10 to 200.

[6] The propylene polymer composition according to any one of [1] to [5], in which a ratio of a weight average molecular weight in terms of polystyrene of the propylene polymer composition to a number average molecular weight in terms of the polystyrene of the propylene polymer composition is 1.5 or more and 3.0 or less.

[7] A composition containing the following component (i) and the following component (ii), in which a number average particle size of a stained domain obtained by staining a cross section of the following test piece formed of the composition including a straight line parallel to a longitudinal direction and a straight line parallel to a thickness direction by vapor of ruthenium tetroxide is 0.050 to 1.20 μm, and a load deflection temperature of the following test piece measured under a condition of a load of 0.45 MPa according to a method defined by JIS K7191 is 65° C. or higher, Component (i): a propylene polymer,
Component (ii): an ethylene-based copolymer, and
Test piece: a test piece of length 80 mm×width 10 mm×thickness 4 mm obtained by injection molding of the composition at a molding temperature of 220° C. and a mold temperature of 50° C.

[8] The composition according to [7], further containing an inorganic filler, in which a content of the inorganic filler is 1 to 40 wt % with respect to a total weight of 100 wt % of the composition.

Effect of the Invention

According to the present invention, a propylene polymer composition capable of implementing a molded article having excellent impact resistance can be provided.

BRIEF DESCRIPTION OF THE DRAWING

FIG. 1 is a schematic view of a test piece.

MODE FOR CARRYING OUT THE INVENTION

Component (A)
A component (A) is a propylene polymer containing a structural unit derived from propylene in an amount of 90 wt % or more with respect to a total weight of 100 wt % of the propylene polymer.

The component (A) preferably contains a highly stereoregular structure. Specifically, the component (A) contains preferably an isotactic polypropylene structure or a syndiotactic polypropylene structure, and more preferably an isotactic polypropylene structure.

In the present specification, the isotactic polypropylene structure is a structure in which an isotactic pentad fraction (hereinafter, referred to as [mmmm]) of the propylene polymer is 0.80 or more. The component (A) has preferably [mmmm] of 0.90 or more, and more preferably 0.95 or more, from the viewpoint of rigidity or heat resistance of a molded article.

In the present specification, the syndiotactic polypropylene structure is a structure in which a syndiotactic pentad fraction (hereinafter, referred to as [rrrr]) of the propylene polymer is 0.70 or more. The component (A) has preferably [rrrr] of 0.80 or more, and more preferably 0.90 or more, from the viewpoint of rigidity or heat resistance of a molded article.

The isotactic pentad fraction and the syndiotactic pentad fraction are calculated from $^{13}C$ nuclear magnetic resonance spectrum (hereinafter, referred to as a $^{13}C$-NMR spectrum) according to a method described in Macromolecules, vol. 6, pp. 925 and 926 (1973). The isotactic pentad fraction is an isotactic fraction in continuous pentad units in a propylene polymer chain, and in total absorption peaks in a methyl carbon region of a $^{13}C$-NMR spectrum, an intensity fraction of a mmmm peak is defined as an isotactic pentad fraction and an intensity fraction of a rrrr peak is defined as a syndiotactic pentad fraction. Assignment of the peak in the NMR spectrum is performed based on a description of Macromolecules, vol. 8, p. 687 (published in 1975).

Examples of the component (A) can include a propylene homopolymer and a propylene-α-olefin copolymer containing a structural unit derived from propylene and a structural unit derived from at least one α-olefin selected from the group consisting of ethylene and an α-olefin having 4 to 10 carbon atoms.

Examples of the at least one α-olefin selected from the group consisting of ethylene and an α-olefin having 4 to 10 carbon atoms can include ethylene, 1-butene, 1-hexene, and 1-octene. The structural unit derived from the at least one α-olefin selected from the group consisting of ethylene and an α-olefin having 4 to 10 carbon atoms is preferably a structural unit derived from ethylene. A content of the structural unit derived from the α-olefin contained in the propylene-α-olefin copolymer is 10 wt % or less, preferably 7 wt % or less, more preferably 3 wt % or less, still more preferably 2 wt % or less, and further still more preferably 1 wt % or less. The component (A) is preferably a propylene homopolymer or a propylene-ethylene random copolymer.

A melting point of the component (A) is preferably 100° C. or higher, more preferably 130° C. or higher, and still more preferably 150° C. or higher, and further still more preferably 155° C. or higher, from the viewpoint of rigidity or heat resistance of a molded article. In general, the melting point of the component (A) is 170° C. or lower.

In the present specification, the melting point is a top temperature of a melting peak obtained by analyzing a melting curve measured by the following differential scanning calorimetry by a method according to JIS K7121-1987, and is a temperature at which a melting endothermic amount is maximized. When the melting curve has a plurality of melting peaks defined by JIS K7121-1987, the top temperature of the melting peak at which the melting endothermic amount is maximized is defined as a melting point.

Differential Scanning Calorimetry
An aluminum pan in which about 5 mg of a sample is enclosed is (1) kept at 220° C. for 5 minutes, is (2) cooled from 220° C. to −90° C. at a rate of 10° C./min, and then, is (3) heated from −90° C. to 220° C. at a rate of 10° C./min, under a nitrogen atmosphere using a differential scanning calorimeter. A differential scanning calorimetry curve obtained by calorimetry in the step (3) is defined as a melting curve.

A number average molecular weight in terms of polystyrene of the component (A) is preferably 20,000 or more, more preferably 40,000 or more, and still more preferably 60,000 or more, from the viewpoint of impact resistance. In general, Mn of the component (A) is 500,000 or less.

A molecular weight distribution of the component (A) is not particularly limited, but is generally 1.5 or more and 3.5 or less. In the present specification, the molecular weight distribution refers to a ratio of a weight average molecular weight to a number average molecular weight, and is described as "Mw/Mn". The number average molecular weight in terms of the polystyrene is described as "Mn" and the weight average molecular weight in terms of the polystyrene is described as "Mw". Mn and Mw are measured by gel permeation chromatography (hereinafter, referred to as GPC).

The component (A) may be a functionalized propylene polymer described below.

Component (B)

A component (B) is at least one polymer selected from the group consisting of an ethylene-α-olefin copolymer and a hydrogenated conjugated diene polymer, in which the ethylene-α-olefin copolymer is a copolymer containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer.

Ethylene-α-Olefin Copolymer

Examples of the α-olefin having 3 to 10 carbon atoms in the ethylene-α-olefin copolymer can include propylene, 1-butene, 1-hexene, 4-methyl-1-pentene, 1-octene, and 1-decene. The structural unit derived from the α-olefin contained in the ethylene-α-olefin copolymer is preferably a structural unit derived from propylene, a structural unit derived from 1-butene, a structural unit derived from 1-hexene, or a structural unit derived from 1-octene, and more preferably a structural unit derived from propylene or a structural unit derived from 1-butene. The ethylene-α-olefin copolymer may contain only one or two or more structural units derived from an α-olefin having 3 to 10 carbon atoms.

In a case where the ethylene-α-olefin copolymer is an ethylene-propylene copolymer, a content of a structural unit derived from ethylene contained in the ethylene-propylene copolymer is preferably more than 10 wt % and 90 wt % or less, more preferably 15 wt % or more and 80 wt % or less, and still more preferably 20 wt % or more and 70 wt % or less. A content of the structural unit derived from the ethylene contained in the ethylene-propylene copolymer is preferably more than 10 wt % from the viewpoint of compatibility between the propylene polymer composition and a component (D) described below, and preferably 90 wt % or less from the viewpoint of impact resistance of an obtained molded article.

In a case where the ethylene-α-olefin copolymer is an ethylene-α-olefin copolymer containing a structural unit derived from ethylene and a structural unit derived from an α-olefin having 4 to 10 carbon atoms, the number of short chain branches of the ethylene-α-olefin copolymer is preferably 10 to 200, and more preferably 20 to 150, per 1,000 total carbon atoms of the ethylene-α-olefin copolymer. In the present specification, the "short chain branch" of the ethylene-α-olefin copolymer refers to an alkyl group having 2 to 8 carbon atoms bonded to a tertiary carbon atom of a main chain of the polymer. The number of short chain branches is calculated from a $^{13}$C-NMR spectrum. The number of short chain branches of the ethylene-α-olefin copolymer is preferably 10 or more from the viewpoint of impact resistance of an obtained molded article, and preferably 200 or less from the viewpoints of rigidity and heat resistance of an obtained molded article.

Hydrogenated Conjugated Diene Polymer

The hydrogenated conjugated diene polymer is a completely or partially hydrogenated material of a conjugated diene polymer. Examples of conjugated diene can include 1,3-butadiene, isoprene, 1,3-pentadiene, 2-methyl-1,3-pentadiene, 1,3-hexadiene, and chloroprene. The conjugated diene is preferably 1,3-butadiene or isoprene. The hydrogenated conjugated diene polymer may contain only one or two or more structural units derived from conjugated diene. Examples of the hydrogenated conjugated diene polymer can include a homopolymer composed of only a structural unit derived from conjugated diene and a copolymer containing structural unit(s) derived from conjugated diene and structural unit(s) derived from other monomers. A content of the structural unit derived from the conjugated diene contained in the hydrogenated conjugated diene polymer is preferably 50 wt % or more, more preferably 70 wt % or more, and still more preferably 80 wt % or more.

Examples of the other monomers can include aromatic vinyl compounds such as styrene, α-methylstyrene, p-methylstyrene, p-ethylstyrene, p-tert-butylstyrene, 1,1-diphenylethylene, vinylnaphthalene, vinylanthracene, and vinylpyridine, α,β-unsaturated carbonyl compounds such as methyl acrylate, ethyl acrylate, butyl acrylate, methyl methacrylate, ethyl methacrylate, acrolein, and maleic anhydride, and acrylonitrile. The hydrogenated conjugated diene polymer may contain two or more structural units derived from these other monomers.

The hydrogenated conjugated diene polymer is obtained by partially or completely hydrogenating a carbon-carbon double bond contained in the conjugated diene polymer other than a carbon-carbon double bond in an aromatic ring. A hydrogenation rate is generally 50% or more, and is preferably 70% or more, more preferably 80% or more, and still more preferably 90% or more, from the viewpoints of prevention of degradation or coloration of the composition due to heat, oxygen, and light and improvement of weather resistance.

A hydrogenation method is not particularly limited, and an example thereof can include a method described in JP-A-11-71426.

The number of short chain branches of the hydrogenated conjugated diene polymer is preferably 10 to 200, and more preferably 20 to 150, per 1,000 total carbon atoms of the hydrogenated conjugated diene polymer. The "short chain branch" of the hydrogenated conjugated diene polymer refers to an alkyl group having 2 to 8 carbon atoms bonded to a tertiary carbon atom of a main chain of the polymer. The number of short chain branches is calculated from a $^1$H-NMR spectrum. The number of short chain branches of the hydrogenated conjugated diene polymer is preferably 10 or more from the viewpoint of impact resistance of an obtained molded article, and preferably 200 or less from the viewpoints of rigidity and heat resistance of an obtained molded article.

Mn of the component (B) is preferably 10,000 to 120,000, more preferably 12,000 to 110,000, still more preferably 15,000 to 100,000, and further still more preferably 20,000 to 100,000, from the viewpoints of prevention of mutual adhesion of pellets including the composition and melt dispersibility of the component (C) in the composition.

Mw/Mn of the component (B) is not particularly limited, but is generally 1.0 or more and 3.5 or less.

The component (B) may be a functionalized elastomer described below.

Component (C)

A component (C) is a propylene block copolymer containing a segment (I) and a segment (II) or a graft copolymer containing a segment (I) and a segment (II).

The propylene block copolymer is a copolymer in which at least one terminal carbon atom of a main chain of the segment (I) and at least one terminal carbon atom of a main chain of the segment (II) are covalently bonded. The propylene block copolymer may be a diblock copolymer composed of one segment (I) and one segment (II) or may be a multi-block copolymer containing a plurality of segments (I) and/or segments (II) and containing the number of blocks of 3 or more.

The graft copolymer is a copolymer containing a main chain composed of a segment (I) and a side chain composed of a segment (II) or a copolymer containing a main chain composed of a segment (II) and a side chain composed of a segment (I). In the graft copolymer containing the main chain composed of the segment (I) and the side chain composed of the segment (II), a carbon atom other than a terminal carbon atom of the main chain of the segment (I) and at least one terminal carbon atom of the main chain of the segment (II) are covalently bonded. In the graft copolymer containing the main chain composed of the segment (II) and the side chain composed of the segment (I), a carbon atom other than a terminal carbon atom of the main chain of the segment (II) and at least one terminal carbon atom of the main chain of the segment (I) are covalently bonded. In general, the graft copolymer contains one or more side chains per one main chain. The "terminal carbon atom of the main chain" refers to a terminal carbon atom of the main chain in a longitudinal direction.

In the propylene block copolymer and the graft copolymer, the bond between the segment (I) and the segment (II) may be a direct covalent bond between the carbon atom of the segment (I) and the carbon atom of the segment (II) or may be a covalent bond through a functional group. Examples of the functional group can include an ester group, an imide group, an amide group, and an alkyl group.

The component (C) is preferably a graft copolymer containing a main chain composed of a segment (I) and a side chain composed of a segment (II).

The propylene polymer composition may also contain a star polymer, miktoarm-shaped star polymer, or hyperbranched polymer containing a plurality of segments (I) and/or segments (II), in addition to the component (C).

Segment (I)

The segment (I) is a propylene polymer segment containing a structural unit derived from propylene in an amount of 90 wt % or more with respect to a total weight of 100 wt % of the propylene polymer segment.

It is preferable that types of the structural units contained in the segment (I) and a content of each of the structural units are substantially the same as the types of the structural units contained in the component (A) and the content of each of the structural units.

The segment (I) preferably contains a highly stereoregular structure. Specifically, the segment (I) contains preferably an isotactic polypropylene structure or a syndiotactic polypropylene structure, and more preferably an isotactic polypropylene structure.

In a case where the segment (I) contains the isotactic polypropylene structure, the segment (I) has preferably [mmmm] of 0.80 or more, more preferably 0.90 or more, and still more preferably 0.95 or more, from the viewpoint of rigidity or heat resistance of a molded article. In a case where the segment (I) contains the syndiotactic polypropylene structure, the segment (I) has preferably [rrrr] of 0.70 or more, more preferably 0.80 or more, and still more preferably 0.90 or more, from the viewpoint of rigidity or heat resistance of a molded article.

Examples of the segment (I) can include a propylene homopolymer segment and a propylene-α-olefin copolymer segment containing a structural unit derived from propylene and a structural unit derived from at least one α-olefin selected from the group consisting of ethylene and an α-olefin having 4 to 10 carbon atoms. The segment (I) is preferably a propylene homopolymer segment. Examples of the at least one α-olefin selected from the group consisting of ethylene and an α-olefin having 4 to 10 carbon atoms can include ethylene, 1-butene, 1-hexene, and 1-octene. The structural unit derived from the at least one α-olefin selected from the group consisting of ethylene and an α-olefin having 4 to 10 carbon atoms is preferably a structural unit derived from ethylene. A content of the structural unit derived from the α-olefin contained in the propylene-α-olefin copolymer segment is 10 wt % or less, preferably 7 wt % or less, more preferably 3 wt % or less, still more preferably 2 wt % or less, and further still more preferably 1 wt % or less.

A melting point of the segment (I) is preferably 100° C. or higher, more preferably 130° C. or higher, and still more preferably 150° C. or higher, and further still more preferably 155° C. or higher, from the viewpoint of rigidity or heat resistance of a molded article. In general, the melting point of the segment (I) is 170° C. or lower.

Mn of the segment (I) (hereinafter, referred to as Mn (I)) is preferably 20,000 or more, more preferably 40,000 or more, and still more preferably 60,000 or more, from the viewpoint of impact resistance. In general, Mn (I) is 500,000 or less from the viewpoint of melt dispersibility of the component (C) in the composition.

Mw/Mn of the segment (I) is not particularly limited, but is generally 1.5 or more and 3.5 or less.

Segment (II)

The segment (II) is at least one segment selected from the group consisting of an ethylene-α-olefin copolymer segment and a hydrogenated conjugated diene polymer segment, in which the ethylene-α-olefin copolymer segment is a segment containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer segment.

It is preferable that types of the structural units contained in the segment (II) and a content of each of the structural units are substantially the same as the types of the structural units contained in the component (B) and the content of each of the structural units.

Ethylene-α-Olefin Copolymer Segment

Examples of the α-olefin having 3 to 10 carbon atoms in the ethylene-α-olefin copolymer segment can include propylene, 1-butene, 1-hexene, 4-methyl-1-pentene, 1-octene, and 1-decene. The structural unit derived from the α-olefin contained in the ethylene-α-olefin copolymer segment is preferably a structural unit derived from propylene, a structural unit derived from 1-butene, a structural unit derived from 1-hexene, or a structural unit derived from 1-octene, and more preferably a structural unit derived from propylene or a structural unit derived from 1-butene. The ethylene-α-olefin copolymer segment may contain only one or two or more structural units derived from an α-olefin having 3 to 10 carbon atoms.

In a case where the ethylene-α-olefin copolymer segment is an ethylene-propylene copolymer segment, a content of a structural unit derived from ethylene contained in the ethylene-propylene copolymer segment is preferably more than 10 wt % and 90 wt % or less, more preferably 15 wt % or more and 80 wt % or less, and still more preferably 20 wt % or more and 70 wt % or less. A content of the structural unit derived from the ethylene contained in the ethylene-α-olefin copolymer segment is preferably more than 10 wt % from the viewpoint of compatibility between the propylene polymer composition and a component (D) described below, and preferably 90 wt % or less from the viewpoint of impact resistance of an obtained molded article.

In a case where the ethylene-α-olefin copolymer segment is an ethylene-α-olefin copolymer segment containing a structural unit derived from ethylene and a structural unit derived from an α-olefin having 4 to 10 carbon atoms, the number of short chain branches of the ethylene-α-olefin copolymer segment is preferably 10 to 200, and more preferably 20 to 150, per 1,000 total carbon atoms of the ethylene-α-olefin copolymer segment. The "short chain branch" of the ethylene-α-olefin copolymer segment refers to an alkyl group having 2 to 8 carbons bonded to a tertiary carbon atom of a main chain of the polymer. The number of short chain branches is calculated from a $^{13}$C-NMR spectrum. The number of short chain branches of the ethylene-α-olefin copolymer segment is preferably 10 or more from the viewpoint of impact resistance of an obtained molded article, and preferably 200 or less from the viewpoints of rigidity and heat resistance of an obtained molded article.

Hydrogenated Conjugated Diene Polymer Segment

The hydrogenated conjugated diene polymer segment is a completely or partially hydrogenated material of a conjugated diene polymer segment. Examples of conjugated diene can include 1,3-butadiene, isoprene, 1,3-pentadiene, 2-methyl-1,3-pentadiene, 1,3-hexadiene, and chloroprene. The conjugated diene is preferably 1,3-butadiene or isoprene. The hydrogenated conjugated diene polymer segment may contain only one or two or more structural units derived from conjugated diene. Examples of the hydrogenated conjugated diene polymer segment can include a homopolymer segment composed of only a structural unit derived from conjugated diene and a copolymer segment containing a structural unit derived from conjugated diene and a structural unit derived from other monomers. A content of the structural unit derived from the conjugated diene contained in the hydrogenated conjugated diene segment is preferably 50 wt % or more, more preferably 70 wt % or more, and still more preferably 80 wt % or more.

Examples of the other monomers can include aromatic vinyl compounds such as styrene, α-methylstyrene, p-methylstyrene, p-ethylstyrene, p-tert-butylstyrene, 1,1-diphenylethylene, vinylnaphthalene, vinylanthracene, and vinylpyridine, α,β-unsaturated carbonyl compounds such as methyl acrylate, ethyl acrylate, butyl acrylate, methyl methacrylate, ethyl methacrylate, acrolein, and maleic anhydride, and acrylonitrile. The hydrogenated conjugated diene polymer segment may contain two or more structural units derived from these other monomers.

The hydrogenated conjugated diene polymer segment is obtained by partially or completely hydrogenating a carbon-carbon double bond contained in the conjugated diene polymer segment other than a carbon-carbon double bond in an aromatic ring. A hydrogenation rate is generally 50% or more, and is preferably 70% or more, more preferably 80% or more, and still more preferably 90% or more, from the viewpoints of prevention of degradation or coloration of the composition due to heat, oxygen, and light and improvement of weather resistance.

A hydrogenation method is not particularly limited, and an example thereof can include a method described in JP-A-11-71426.

The number of short chain branches of the hydrogenated conjugated diene polymer segment is preferably 10 to 200, and more preferably 20 to 150, per 1,000 total carbon atoms of the hydrogenated conjugated diene polymer segment. The "short chain branch" of the hydrogenated conjugated diene polymer segment refers to an alkyl group having 2 to 8 carbon atoms bonded to a tertiary carbon atom of a main chain of the polymer. The number of short chain branches is calculated from a $^{13}$C-NMR spectrum. The number of short chain branches of the hydrogenated conjugated diene polymer segment is preferably 10 or more from the viewpoint of impact resistance of an obtained molded article, and preferably 200 or less from the viewpoints of rigidity and heat resistance of an obtained molded article.

Mn of the segment (II) (hereinafter, referred to as Mn (II)) is preferably 10,000 to 120,000, more preferably 12,000 to 110,000, still more preferably 15,000 to 100,000 and further still more preferably 20,000 to 100,000, from the viewpoints of prevention of mutual adhesion of pellets including the composition and melt dispersibility of the component (C) in the composition.

Mw/Mn of the segment (II) is not particularly limited, but is generally 1.0 or more and 3.5 or less.

Requirement (1)

An intrinsic viscosity of the propylene polymer composition is 0.5 dl/g or more, preferably 0.6 dl/g or more, and more preferably 0.7 dl/g or more. The intrinsic viscosity of the propylene polymer composition is preferably 3.0 dl/g or less, more preferably 2.0 dl/g or less, and still more preferably 1.5 dl/g or less, from the viewpoint of processability.

In the present specification, the intrinsic viscosity is a value measured in tetralin at a temperature of 135° C. The intrinsic viscosity measured in the tetralin at the temperature of 135° C. is described as [η].

[η] of the propylene polymer composition can be adjusted by adjusting [η] of the component (A), [η] of the component (B), and [η] of the component (C), and the contents of the component (A), the component (B), and the component (C). An intrinsic viscosity of a main component among [η] of the component (A), [η] of the component (B), and [η] of the component (C) is preferably 1.0 dl/g or more. For example, [η] of the propylene polymer composition can be 1.0 dl/g or more by setting the content of the component (C) to 50 to 99.9 wt % with respect to 100 wt % of the propylene polymer composition and setting [η] of the component (C) to 1.0 dl/g or more. In general, [η] of the polymer can be increased by increasing a molecular weight of the polymer.

Requirement (2)

At least one of a number average molecular weight in terms of polystyrene of CXIS and a number average molecular weight in terms of polystyrene of CHIS is 40,000 or more, and is preferably 50,000 or more, and more preferably 60,000 or more, from the viewpoint of impact resistance of an obtained molded article. In addition, the at least one of the number average molecular weight in terms of the polystyrene of the CXIS and the number average molecular weight in terms of the polystyrene of the CHIS is preferably 300,000 or less, more preferably 200,000 or less, and still more preferably 150,000 or less, from the viewpoint of processability.

CXIS and CXS are distinguished by the following method. p-Xylene is added to the propylene polymer composition and heated to dissolve the mixture, and the mixture is cooled to 5° C. and then allowed to stand at 25° C. for 2 hours. After the standing, a precipitated polymer is CXIS. A polymer contained in a p-xylene solution after filtering the CXIS is CXS.

CHIS and CHS are distinguished by the following method. An insoluble part obtained by adding n-heptane to the propylene polymer composition and then stirring the mixture at 25° C. for 6 hours is CHIS. A polymer contained in an n-heptane solution after filtering the CHIS is CHS.

Mn of the CXIS of the propylene polymer composition can be adjusted by adjusting Mn of the component (A) and/or Mn of the component (C), and for example, Mn of the CXIS of the propylene polymer composition can be 80,000 or more by setting each of Mn of the component (A) and Mn of the component (C) to 80,000 or more. In addition, for example, Mn of the CXIS of the propylene polymer composition can be 80,000 or more by setting the content of the component (C) to 50 to 99.9 wt % with respect to 100 wt % of the propylene polymer composition and setting Mn of the component (C) to 80,000 or more. Mn of the CHIS of the propylene polymer composition is also the same as described above.

Both Mn of the CXIS and Mn of the CHIS may be 40,000 or more.

Requirement (3)

At least one of a ratio of the number average molecular weight in terms of the polystyrene of the CXIS to a number average molecular weight in terms of polystyrene of the CXS and a ratio of the number average molecular weight in terms of the polystyrene of the CHIS to a number average molecular weight in terms of polystyrene of the CHS is 0.5 or more and 20 or less, preferably 0.6 or more and 10 or less, and more preferably 0.6 or more and 5 or less. The ratio is preferably 0.6 or more from the viewpoints of rigidity and heat resistance of an obtained molded article, and preferably 5 or less from the viewpoint of impact resistance of an obtained molded article. When Mn of the component (B) is increased, Mn of the CXS or Mn of the CHS is increased, and when a sum of Mn of the component (A) and Mn of the component (B) is increased, Mn of the CXIS or Mn of the CHIS is increased. Mn of the component (A) and Mn of the component (B) contained in the propylene polymer composition are adjusted to satisfy the requirement (3).

Requirement (4)

At least one of the number average molecular weight in terms of the polystyrene of the CXS and the number average molecular weight in terms of the polystyrene of the CHS is 120,000 or less, preferably 110,000 or less, and more preferably 105,000 or less. In addition, the at least one of the number average molecular weight in terms of the polystyrene of the CXS and the number average molecular weight in terms of the polystyrene of the CHS is preferably 5,000 or more, more preferably 7,000 or more, and still more preferably 10,000 or more, from the viewpoint of prevention of mutual adhesion of pellets including the composition.

For example, the at least one of the number average molecular weight in terms of the polystyrene of the CXS and the number average molecular weight in terms of the polystyrene of the CHS can be 120,000 or less by setting Mn of the component (B) to 120,000 or less.

Requirement (5)

A content of ash in the propylene polymer composition is 1 to 5,000 wt. ppm, and preferably 1 to 3,000 wt. ppm, and more preferably 10 to 2,000 wt. ppm, from the viewpoint of thermal decomposition resistance during processing. Examples of the ash in the propylene polymer composition can include a zinc element, an aluminum element, a phosphorus element, and a calcium element.

In the present specification, the content of the ash is measured by the following method based on JIS K7250-1.

A sample (standard condition: 30 g) is fired in an electric furnace, and the sample is heated until a residue becomes a constant weight (standard condition: at 800° C. for 60 minutes). The residue is removed from the electric furnace and cooled in a desiccator for about 1 hour until the temperature reaches room temperature. Thereafter, the residue is weighed and the content (wt. ppm) of the ash is calculated by the following equation.

$$\text{Content (wt. ppm) of ash} = (\text{weight of residue/weight of sample before firing}) \times 10^6$$

The content of the ash in the propylene polymer composition can be reduced by reducing the amounts of metal elements contained in the component (A), the component (B), and the component (C). The amounts of the metal elements contained in the component (A), the component (B), and the component (C) can be reduced by using a catalyst in which a metal element is not contained or improving activity of each catalyst, the catalyst being used for synthesis of the component (A), the component (B), or the component (C).

An example of a component (A) in which the content of the metal element is small can include a terminally functionalized propylene polymer described below obtained by reacting a propylene polymer polymerized with a Ziegler Natta catalyst with $\alpha,\beta$-unsaturated carboxylic acid or anhydride thereof in the presence of an organic peroxide.

An example of a component (B) in which the content of the metal element is small can include an amino group-modified hydrogenated conjugated diene polymer obtained by polymerizing conjugated diene in the presence of a polymerization initiator having an amino group lithiated by an organic lithium compound with 2 equivalents or more of a precursor of the polymerization initiator as described below.

An example of a method for obtaining a propylene polymer composition in which the requirement (5) is satisfied can include a method of mixing the component (A) and the component (B) with each other and partially reacting these components with each other described below.

Content of Zinc Element

A content of the zinc element in the propylene polymer composition is preferably 1 to 5,000 wt. ppm, more preferably 1 to 1,000 wt. ppm, and still more preferably 10 to 200 wt. ppm.

In the present specification, the content of the zinc element is measured by the following method.

A sample is thermally pressed at 190° C. and then cooled to prepare a sheet having a thickness of 4 mm for measurement. Fluorescent X-rays of the sheet for measurement are measured by a fluorescent X-ray analysis device based on JIS K0119. Separately, a calibration curve is prepared by calculating a relationship between a concentration of the zinc element and an intensity of X-rays by using a sample for a calibration curve. A content of the zinc element in the sheet for measurement is calculated based on the calibration curve.

In a case where a catalyst is used for synthesizing the component (A), the component (B), and the component (C), a catalyst in which a zinc element is not contained can be used, or activity of each catalyst is improved, such that the content of the zinc element can be reduced.

Content of Each Component in Composition

A content of the component (C) is preferably 10 wt % or more, more preferably 20 wt % or more, and still more preferably 30 wt % or more, with respect to a total weight of 100 wt % of the propylene polymer composition, from the viewpoint of impact resistance of an obtained molded article. In general, the content of the component (C) is 99.9 wt % or less.

A total content of the component (A) and the component (B) is preferably 90 wt % or less, more preferably 80 wt % or less, and still more preferably 70 wt % or less, with respect to the total weight of 100 wt % of the propylene polymer composition. In general, the total content of the component (A) and the component (B) is 0.1 wt % or more.

A content of the component (A) is preferably 80 wt % or less, more preferably 70 wt % or less, and still more preferably 60 wt % or less, with respect to the total weight of 100 wt % of the propylene polymer composition. In general, the content of the component (A) is 0.05 wt % or more.

A content of the component (B) is preferably 30 wt % or less, more preferably 20 wt % or less, and still more preferably 10 wt % or less, with respect to the total weight of 100 wt % of the propylene polymer composition. In general, the content of the component (B) is 0.05 wt % or more.

The component (B) which does not bond to the segment (I) is contained in each of the CXS and the CHS. A content of each of the CXS and the CHS is preferably 50 wt % or less, more preferably 30 wt % or less, and still more preferably 20 wt % or less, with respect to the total weight of 100 wt % of the propylene polymer composition, from the viewpoints of rigidity and heat resistance of an obtained molded article.

In a case where a type and amount of the structural unit of the component (A) contained in the propylene polymer composition are the same as the type and amount of the structural unit of the segment (I) of the component (C) and a type and amount of the structural unit of the component (B) are the same as the type and amount of the structural unit of the segment (II) of the component (C), a content y (wt %) of the component (C) with respect to the total weight of 100 wt % of the propylene polymer composition can be calculated by the following Equation (3).

$$y = z \times E_{IS} \times \{(Mn_{(I)} + Mn_{(II)})/Mn_{(II)}\} \quad (3)$$

z is a content (wt %) of the CXIS or the CHIS with respect to the total weight of 100 wt % of the propylene polymer composition. z can be increased by increasing a total content of (A) and (C).

$E_{IS}$ is a content (wt %) of the segment (II) contained in the CXIS or the CHIS with respect to the weight of 100 wt % of CXIS or CHIS of the propylene polymer composition.

$Mn_{(I)}$ is Mn of the segment (I) of the component (C).

$Mn_{(II)}$ is Mn of the segment (II) of the component (C). $Mn_{(II)}$ may use Mn of the CXS or the CHS of the propylene polymer composition.

$Mn_{(I)} + Mn_{(II)}$ may use Mn of the CXIS or the CHIS of the propylene polymer composition.

Each of the content of the component (B), the content ($E_{IS}$) of the segment (II) contained in the CXIS or the CHIS, the content of the structural unit derived from the ethylene, and the content of the structural unit derived from the α-olefin in the propylene polymer composition is calculated from a $^{13}$C-NMR spectrum based on Macromolecules, vol. 15, pp. 1150 to 1152, 1982. Each of the contents can be calculated by IR measurement through creation of a calibration curve based on the results of $^{13}$C-NMR. In addition, each of the contents can also be calculated from a crystal-melting calorie obtained by differential scanning calorimetry.

In a case where the component (B) contained in the propylene polymer composition is an ethylene-propylene copolymer, the segment (II) of the component (C) is preferably an ethylene-propylene copolymer segment.

In a case where the component (B) contained in the propylene polymer composition is an ethylene-α-olefin copolymer containing a structural unit derived from ethylene and a structural unit derived from an α-olefin having 4 to 10 carbon atoms, the segment (II) of the component (C) is preferably an ethylene-α-olefin copolymer segment containing a structural unit derived from ethylene and a structural unit derived from an α-olefin having 4 to 10 carbon atoms.

In a case where the component (B) contained in the propylene polymer composition is a hydrogenated conjugated diene polymer, the segment (II) of the component (C) is preferably a hydrogenated conjugated diene polymer segment.

A ratio of a weight average molecular weight in terms of polystyrene of the propylene polymer composition to a number average molecular weight in terms of the polystyrene of the propylene polymer composition is preferably 1.5 or more and 3.0 or less. For example, Mw/Mn of each of the component (A), the component (B), and the component (C) is 1.5 or more and 3.0 or less, Mn of the component (A) is 20,000 or more and 500,000 or less, and Mn of the component (B) is 10,000 to 120,000, such that the ratio of the weight average molecular weight in terms of the polystyrene of the propylene polymer composition to the number average molecular weight in terms of the polystyrene of the propylene polymer composition can be 1.5 or more and 3.0 or less.

A melting point of the propylene polymer composition of the present invention is preferably 100° C. or higher. In general, the melting point of the propylene polymer composition of the present invention is preferably 170° C. or lower. The propylene polymer composition of the present invention may have two or more melting points. Among the melting points of the propylene polymer composition of the present invention, the highest melting point is preferably 130° C. or higher, and more preferably 155° C. or higher, from the viewpoints of rigidity and heat resistance of an obtained molded article.

The melting point of the propylene polymer composition of the present invention is based on a melting point of the component (A), a melting point of the component (B), and a melting point of the component (C). The melting point of the propylene polymer composition can be 100° C. or higher by setting at least one of the melting point of the component (A), the melting point of the component (B), and the melting point of the component (C) to 100° C. or higher. The melting point of the component (A) and/or the melting point of the component (C) is preferably 100° C. or higher.

The melting point of the component (A) can be adjusted by adjusting the content of the structural unit derived from propylene in the component (A), and when the content of the structural unit derived from the propylene in the component (A) is increased, the melting point of the component (A) can be increased. When a content of the segment (I) in the component (C) is 30 to 95 wt % with respect to a weight of 100 wt % of the component (C) and the content of the structural unit derived from propylene in the segment (I) is increased, the melting point of the component (C) can be increased.

In a case where the segment (I) in the component (C) is a segment derived from the component (A) and the content of the segment (I) in the component (C) is 30 to 95 wt %, since the melting point of the component (C) and the melting point of the component (A) are substantially the same as each other, the melting point of the propylene polymer composition can be 100° C. or higher by setting the melting point of the component (A) to 100° C. or higher.

The propylene polymer composition may be mixed with a component (D) described below after purification such as extraction and reprecipitation or may be mixed with a component (D) described below in an unpurified state. A mixture may be obtained by mixing the above-described CXIS or CHIS with a component (D) described below.

The propylene polymer composition may contain an additive, if necessary. Examples of the additive can include a lubricant, a neutralizing agent, an adsorbent, an antioxidant, a copper inhibitor, a nucleating agent, an ultraviolet absorber, an antistatic agent, an anti-blocking agent, a processing aid, an organic peroxide, a coloring agent such as an inorganic pigment, an organic pigment, a pigment dispersant, or a dye, a plasticizer, a flame retardant, an antibacterial agent, a light diffusion agent, and a foaming agent. These additives may be used alone or in combination of two or more thereof. A content of such an additive is not particularly limited. In a case where the propylene polymer composition contains additives, the content of each of the additives is generally 0.01 to 5 wt % with respect to the total weight of 100 wt % of the propylene polymer composition.

Method of Producing Propylene Polymer Composition

A method of producing the propylene polymer composition is not particularly limited, and an example thereof can include a production method including a step of mixing a functionalized propylene polymer and a functionalized elastomer with each other and partially reacting the functionalized propylene polymer and the functionalized elastomer with each other (hereinafter, Referred to as a "Coupling Reaction Step").

Functionalized Propylene Polymer

The functionalized propylene polymer is a polymer in which at least one hydrogen atom in the propylene polymer is substituted with a functional group other than an alkyl group. The functionalized propylene polymer is preferably a component (K).

Component (K): Maleic anhydride-modified propylene polymer

Examples of the functionalized propylene polymer can include the following terminally functionalized propylene polymer and in-chain functionalized propylene polymer. The functionalized propylene polymer is preferably the component (A). It is preferable that the functionalized propylene polymer contains a structural unit derived from propylene in an amount of 90 wt % or more with respect to a total weight of 100 wt % of the polymer.

Terminally Functionalized Propylene Polymer

The terminally functionalized propylene polymer is a propylene polymer in which at least one terminal hydrogen atom of a main chain in the propylene polymer is substituted with a functional group other than an alkyl group.

An example of the terminally functionalized propylene polymer can include a terminal acid-modified propylene polymer. An example of the terminal acid-modified propylene polymer can include a terminal maleic anhydride-modified propylene polymer.

The terminal acid-modified propylene polymer can be obtained by modifying a propylene polymer having a double bond at at least one terminal of a main chain by α,β-unsaturated carboxylic acid or anhydride thereof.

A preferred structure of the terminally functionalized propylene polymer is the same as a preferred structure of the component (A).

Propylene Polymer Having Double Bond at Terminal

The propylene polymer having the double bond at the terminal of the main chain is produced by a method of polymerizing propylene in the presence of a metallocene catalyst and in the absence of hydrogen or in the presence of a very small amount of hydrogen or a method of molecule-cleaving a high molecular weight propylene polymer in the presence of an organic peroxide. For example, the propylene polymer can be produced by methods described in JP-A-2001-525461 and JP-A-2009-299045. A range of an average amount of terminal double bond of the propylene polymer having the double bond at the terminal which is suitable as a raw material of the terminally functionalized propylene polymer per molecular chain is 0.1 or more and 2.0 or less, preferably 0.3 or more and 1.8 or less, more preferably 0.5 or more and 1.5 or less, and still more preferably 0.7 or more 1.2 or less. The average amount of terminal double bond can be adjusted by adjusting polymerization conditions such as a type of a catalyst, a polymerization temperature, and a monomer concentration. The average amount of terminal double bond is preferably 0.1 or more from the viewpoint of impact resistance of a molded article, and preferably 2.0 or less from the viewpoints of mechanical properties and an appearance of a molded article.

Method of Producing Terminally Functionalized Propylene Polymer

An example of a method of producing the terminally functionalized propylene polymer can include a production method including a step of heating and mixing a propylene polymer having a double bond at a terminal of a main chain and α,β-unsaturated carboxylic acid or anhydride thereof in the presence or absence of a solvent.

Examples of the α,β-unsaturated carboxylic acid or the anhydride thereof can include maleic acid, fumaric acid, itaconic acid, and anhydrides thereof, and the α,β-unsaturated carboxylic acid or the anhydride thereof is preferably maleic acid and maleic anhydride. In the step, an acid catalyst such as Bronsted acid or Lewis acid may be added to promote a reaction of the propylene polymer having the double bond at the terminal of the main chain and the α,β-unsaturated carboxylic acid or the anhydride thereof.

Examples of the solvent can include a hydrocarbon solvent such as hexane, heptane, octane, decane, dodecane, cyclohexane, methylcyclohexane, or decalin; an aromatic hydrocarbon solvent such as toluene, xylene, ethylbenzene, cumene, cymene, mesitylene, or tetralin; a halogenated hydrocarbon solvent such as dichloromethane, chloroform, dichloroethane, trichloroethane, tetrachloroethane, chlorobutane, chlorobenzene, dichlorobenzene, or trichlorobenzene; an ether solvent such as diethyl ether, tetrahydrofuran, tetrahydropyran, dioxane, ethylene glycol dimethyl ether, diethylene glycol dimethyl ether, triethylene glycol dimethyl ether, or tetraethylene glycol dimethyl ether; and an aprotic polar solvent such as dimethylformamide, dimethylacetamide, N-methylpyrrolidone, N,N-dimethylimidazolidi-

In-Chain Functionalized Propylene Polymer

The in-chain functionalized propylene polymer is a propylene polymer in which at least one hydrogen atom other than the terminal hydrogen atom of a main chain in the propylene polymer is substituted with a functional group other than an alkyl group.

An example of the in-chain functionalized propylene polymer can include an in-chain acid-modified propylene polymer. An example of the in-chain acid-modified propylene polymer can include an in-chain maleic anhydride-modified propylene polymer.

The in-chain acid-modified propylene polymer can be obtained by reacting a propylene polymer, an organic peroxide, and α,β-unsaturated carboxylic acid or anhydride thereof with each other.

Method of Producing in-Chain Functionalized Propylene Polymer

An example of a method of producing the in-chain functionalized propylene polymer can include a production method including a step of heating and mixing a propylene polymer, an organic peroxide, and α,β-unsaturated carboxylic acid or anhydride thereof in the presence or absence of a solvent.

Examples of the α,β-unsaturated carboxylic acid or the anhydride thereof can include maleic acid, fumaric acid, itaconic acid, and anhydrides thereof, and the α,β-unsaturated carboxylic acid or the anhydride thereof is preferably maleic acid and maleic anhydride.

A specific and preferred example of the solvent is the same as that of the solvent used in the production of the terminally functionalized propylene polymer.

Examples of the organic peroxide can include dicetyl peroxydicarbonate, di-3-methoxybutyl peroxydicarbonate, di-2-ethylhexyl peroxydicarbonate, bis(4-tert-butylcyclohexyl)peroxydicarbonate, diisopropyl peroxydicarbonate, tert-butylperoxyisopropyl carbonate, dimyristyl peroxycarbonate, 1,1,3,3-tetramethylbutyl neodecanoate, α-cumylperoxy neodecanoate, tert-butylperoxy neodecanoate, 1,1-bis(tert-butylperoxy)cyclohexane, 2,2-bis(4,4-di-tert-butylperoxycyclohexyl)propane, 1,1-bis(tert-butylperoxy)cyclododecane, tert-hexylperoxy isopropyl monocarbonate, tert-butylperoxy-3,5,5-trimethylhexanoate, tert-butylperoxy laurate, 2,5-dimethyl-2,5-di(benzoylperoxy)hexane, tert-butylperoxy acetate, 2,2-bis(tert-butylperoxy)butene, tert-butylperoxy benzoate, n-butyl-4,4-bis(tert-beloxy)valerate, di-tert-butylbeloxyisophthalate, dicumyl peroxide, α-α'-bis(tert-butylperoxy-m-isopropyl)benzene, 2,5-dimethyl-2,5-di(tert-butylperoxy) hexane, 1,3-bis(tert-butylperoxydiisopropyl)benzene, tert-butyl cumyl peroxide, di-tert-butyl peroxide, p-menthane hydroperoxide, 2,5-dimethyl-2,5-di(tert-butylperoxy)hexin-3, and bis(tert-butylperoxyisopropyl)benzene, and as the organic peroxide, dicetyl peroxydicarbonate or 1,3-bis(tert-butylperoxyisopropyl)benzene is preferred.

Functionalized Elastomer

The functionalized elastomer is an elastomer in which at least one hydrogen atom in at least one polymer selected from the group consisting of an ethylene-α-olefin copolymer and a hydrogenated conjugated diene polymer is substituted with a functional group other than an alkyl group. Preferred examples of the functional group can include a hydroxyl group and an amino group.

Examples of the functionalized elastomer can include a hydroxyl group-modified ethylene-α-olefin copolymer, an amino group-modified ethylene-α-olefin copolymer, a hydroxyl group-modified hydrogenated conjugated diene polymer, and an amino group-modified hydrogenated conjugated diene polymer.

In the present specification, the "hydroxyl group-modified ethylene-α-olefin copolymer" refers to a copolymer in which at least one hydrogen atom of an ethylene-α-olefin copolymer is substituted with a hydroxyl group. The "amino group-modified ethylene-α-olefin copolymer" refers to a copolymer in which at least one hydrogen atom of an ethylene-α-olefin copolymer is substituted with an amino group. The "hydroxyl group-modified hydrogenated conjugated diene polymer" refers to a polymer in which at least one hydrogen atom of a hydrogenated conjugated diene polymer is substituted with a hydroxyl group. The "amino group-modified hydrogenated conjugated diene polymer" refers to a polymer in which at least one hydrogen atom of a hydrogenated conjugated diene polymer is substituted with an amino group.

The functionalized elastomer is preferably a component (L).

Component (L): at least one polymer selected from the group consisting of a hydroxyl group-modified ethylene-α-olefin copolymer, an amino group-modified ethylene-α-olefin copolymer, a hydroxyl group-modified hydrogenated conjugated diene polymer, and an amino group-modified hydrogenated conjugated diene polymer, in which each of the hydroxyl group-modified ethylene-α-olefin copolymer and the amino group-modified ethylene-α-olefin copolymer is a copolymer containing a structural unit derived from ethylene in an amount of more than 10 wt % and 99 wt % or less with respect to a total weight of 100 wt % of the copolymer.

The functionalized elastomer is preferably a component (B). A preferred structure of the terminally functionalized elastomer is the same as a preferred structure of the component (B).

Examples of the functionalized elastomer can include a terminally functionalized elastomer and an in-chain functionalized elastomer. The terminally functionalized elastomer is an elastomer in which at least one terminal hydrogen atom of at least one polymer selected from the group consisting of an ethylene-α-olefin copolymer and a hydrogenated conjugated diene polymer is substituted with a functional group other than an alkyl group. The in-chain functionalized elastomer is an elastomer in which at least one hydrogen atom of at least one polymer selected from the group consisting of an ethylene-α-olefin copolymer and a hydrogenated conjugated diene polymer, other than a terminal hydrogen atom of a main chain is substituted with a functional group other than an alkyl group.

Hydroxyl Group-Modified Ethylene-α-Olefin Copolymer

Examples of the hydroxyl group-modified ethylene-α-olefin copolymer can include a terminal hydroxyl group-modified ethylene-α-olefin copolymer and an in-chain hydroxyl group-modified ethylene-α-olefin copolymer.

Examples of a method of producing the hydroxyl group-modified ethylene-α-olefin copolymer can include the following methods.

(Method 1) A production method including a step of reacting an ethylene-α-olefin copolymer having a double bond at a terminal of a main chain and a compound containing a group 13 element with each other to obtain an ethylene-α-olefin copolymer having a functional group containing the group 13 element at a terminal of a main chain and a step of oxidizing the ethylene-α-olefin copolymer having the functional group containing the group 13 element at the terminal of the main chain with an oxidizer to obtain a terminal hydroxyl group-modified ethylene-α-olefin copolymer (Method 2) A production method including a step of reacting an ethylene-α-olefin copolymer having a carboxylic group or a carboxylic anhydride group and a compound having two or more hydroxyl groups or a compound having a hydroxyl group and an amino group with each other Hereinafter, the "ethylene-α-olefin copolymer having the carboxylic group or the carboxylic anhydride group" is referred to as an "acid-modified ethylene-α-olefin copolymer".

Each of the "compound having two or more hydroxyl groups" and the "compound having the hydroxyl group and the amino group" is referred to as a "linker agent (F)".

Ethylene-α-Olefin Copolymer Having Double Bond at Terminal

The ethylene-α-olefin copolymer having the double bond at the terminal of the main chain is produced by a method of polymerizing ethylene and an α-olefin in the presence of a specific olefin polymerization catalyst that causes a chain transfer reaction or a method of molecule-cleaving a high molecular weight ethylene-α-olefin copolymer in the presence of an organic peroxide. A range of an average amount of terminal double bond of the ethylene-α-olefin copolymer having the double bond at the terminal of the main chain which is suitable as a raw material of the terminally functionalized ethylene-α-olefin copolymer per molecular chain is preferably 0.1 or more and 2.0 or less, more preferably 0.3 or more and 1.8 or less, still more preferably 0.5 or more and 1.5 or less, and further still more preferably 0.7 or more 1.2 or less. The average amount of terminal double bond per molecular chain is preferably 0.1 or more from the viewpoint of increasing the content of the component (C) contained in the propylene polymer composition. The average amount of terminal double bond per molecular chain is preferably 2.0 or less from the viewpoint of suppressing a formation of gel in an obtained propylene polymer composition.

Compound Containing Group 13 Element

Examples of the compound containing the group 13 element can include an aluminum hydride compound such as diisobutylaluminum hydride and a boron hydride compound such as borane or 9-borabicyclo[3.3.1]nonane. Examples of the oxidizer for oxidizing an ethylene-α-olefin copolymer having a boron-containing functional group at a terminal obtained by using the boron hydride compound can include molecular oxygen and hydrogen peroxide.

Acid-Modified Ethylene-α-Olefin Copolymer

Examples of the acid-modified ethylene-α-olefin copolymer can include a terminal acid-modified ethylene-α-olefin copolymer and an in-chain acid-modified ethylene-α-olefin copolymer.

An example of a method of producing the terminal acid-modified ethylene-α-olefin copolymer can include a production method including a step of heating and mixing an ethylene-α-olefin copolymer having a double bond at a terminal of a main chain and α,β-unsaturated carboxylic acid or anhydride thereof in the presence or absence of a solvent.

An example of a method of producing the in-chain acid-modified ethylene-α-olefin copolymer can include a production method including a step of heating and mixing an ethylene-α-olefin copolymer, an organic peroxide, and α,β-unsaturated carboxylic acid or anhydride thereof in the presence or absence of a solvent.

A specific and preferred example of the α,β-unsaturated carboxylic acid or the anhydride thereof is the same as that of the α,β-unsaturated carboxylic acid or the anhydride thereof used in the production of the terminally functionalized propylene polymer. In the step, an acid catalyst such as Bronsted acid or Lewis acid may be added to promote a reaction of the ethylene-α-olefin copolymer having the double bond at the terminal of the main chain and the α,β-unsaturated carboxylic acid or the anhydride thereof.

A specific and preferred example of the solvent is the same as that of the solvent used in the production of the terminally functionalized propylene polymer.

A specific and preferred example of the organic peroxide is the same as that of the organic peroxide used in the production of the in-chain functionalized propylene polymer.

Linker Agent (F)

The linker agent (F) is preferably a compound having a hydroxyl group and an amino group.

Examples of the linker agent (F) can include 2-aminoethanol, 3-aminopropan-1-ol, 1-aminopropan-2-ol, 4-aminobutan-1-ol, 1-aminobutan-2-ol, 6-aminohexan-1-ol, 8-aminooctan-1-ol, 10-aminodecan-1-ol, 12-diaminododecan-1-ol, ethylene glycol, propylene glycol, 1,3-propanediol, 1,4-butanediol, 1,6-hexanediol, 1,8-octanediol, 1,10-decanediol, 1,12-dodecanediol, neopentyl glycol, and cyclohexanedimethanol, and as the linker agent (F), 2-aminoethanol, 3-aminopropan-1-ol, 4-aminobutan-1-ol, or 6-aminohexan-1-ol is preferred.

In the method 2, the step of reacting the acid-modified ethylene-α-olefin copolymer and the linker agent (F) with each other can be performed in the presence or absence of a solvent.

In general, a use amount of the linker agent (F) is 1 equivalent to 1,000 equivalents, preferably 2 equivalents to 500 equivalents, and more preferably 5 equivalents to 100 equivalents, with respect to the functional group of the acid-modified ethylene-α-olefin copolymer. A reaction time can be shortened by using 2 equivalents or more of the linker agent (F).

In the method 2, a specific example of the solvent to be used is the same as the solvent used in the production of the terminally functionalized propylene polymer. In a case where the linker agent (F) is a liquid at a reaction temperature, the linker agent (F) may be used as a solvent. In general, a use amount of the solvent is 1 to 100-fold by weight with respect to the acid-modified ethylene-α-olefin copolymer.

In the method 2, an example of the step of reacting the acid-modified ethylene-α-olefin copolymer and the linker agent (F) with each other can include a step of melting and kneading the acid-modified ethylene-α-olefin copolymer and the linker agent (F) using a melt kneading apparatus and reacting them with each other.

Examples of the melt kneading apparatus can include a continuous type kneading apparatus such as a single screw extruder or a twin screw extruder, a batch type kneader such as a Bunbury mixer, and a heat roll.

In general, the reaction temperature is 0° C. or higher and 300° C. or lower, preferably 10° C. or higher and 280° C. or lower, and more preferably 20° C. or higher and 250° C. or lower.

In order to promote the reaction between the acid-modified ethylene-α-olefin copolymer and the linker agent (F), a dehydration condensing agent such as Bronsted acid catalysts such as sulfuric acid, methanesulfonic acid, and p-toluenesulfonic acid; Lewis acid catalysts such as aluminum chloride, tin chloride, iron chloride, titanium tetraisopropoxide, and dibutyltin laurate; amines such as triethylamine, tributylamine, pyridine, and diazabicycloundecene; and dicyclohexylcarbodiimide may be added.

In general, the reaction time is several seconds to 24 hours. After the reaction, the obtained hydroxyl group-modified ethylene-α-olefin copolymer can be purified by known purification methods such as solvent extraction and reprecipitation.

In the method 2, in a case where a terminal acid-modified ethylene-α-olefin copolymer is used as the acid-modified ethylene-α-olefin copolymer, a terminal hydroxyl group-modified ethylene-α-olefin copolymer can be obtained. In a case where an in-chain acid-modified ethylene-α-olefin copolymer is used as the acid-modified ethylene-α-olefin copolymer, an in-chain hydroxyl group-modified ethylene-α-olefin copolymer can be obtained.

Amino Group-Modified Ethylene-α-Olefin Copolymer

Examples of the amino group-modified ethylene-α-olefin copolymer can include a terminal amino group-modified ethylene-α-olefin copolymer and an in-chain amino group-modified ethylene-α-olefin copolymer.

A method of producing the amino group-modified ethylene-α-olefin copolymer can include a production method including a step of reacting an acid-modified ethylene-α-olefin copolymer and a compound having two amino groups with each other.

The "compound having two amino groups" is referred to as a "linker agent (G)".

Linker Agent (G)

Examples of the linker agent (G) can include ethylenediamine, 1,2-diaminopropane, 1,3-diaminopropane, 1,4-diaminobutane, 1,6-diaminohexane, 1,8-diaminooctane, 1,10-diaminodecane, 1,12-diaminododecane, m-xylylenediamine, p-xylylenediamine, isophoronediamine, 1,3-phenylenediamine, and 1,4-phenylenediamine.

The step of reacting the acid-modified ethylene-α-olefin copolymer and the linker agent (G) with each other can be performed in the presence or absence of a solvent.

In general, a use amount of the linker agent (G) is 1 equivalent to 1,000 equivalents, preferably 2 equivalents to 500 equivalents, and more preferably 5 equivalents to 100 equivalents, with respect to the functional group of the acid-modified ethylene-α-olefin copolymer. A reaction time can be shortened by using 2 equivalents or more of the linker agent (G).

A specific example of the solvent to be used is the same as that of the solvent used in the production of the terminally functionalized propylene polymer. In a case where the linker agent (G) is a liquid at a reaction temperature, the linker agent (G) may be used as a solvent. In general, a use amount of the solvent is 1 to 100-fold by weight with respect to the acid-modified ethylene-α-olefin copolymer.

An example of the step of reacting the acid-modified ethylene-α-olefin copolymer and the linker agent (G) with each other can include a step of melting and kneading the acid-modified ethylene-α-olefin copolymer and the linker agent (G) using a melt kneading apparatus and reacting them with each other.

Examples of the melt kneading apparatus can include a continuous type kneading apparatus such as a single screw extruder or a twin screw extruder, a batch type kneader such as a Bunbury mixer, and a heat roll.

In general, the reaction temperature is 0° C. or higher and 300° C. or lower, preferably 10° C. or higher and 280° C. or lower, and more preferably 20° C. or higher and 250° C. or lower.

In order to promote the reaction between the acid-modified ethylene-α-olefin copolymer and the linker agent (G), a dehydration condensing agent such as Bronsted acid catalysts such as sulfuric acid, methanesulfonic acid, and p-toluenesulfonic acid; Lewis acid catalysts such as aluminum chloride, tin chloride, iron chloride, titanium tetraisopropoxide, and dibutyltin laurate; amines such as triethylamine, tributylamine, pyridine, and diazabicycloundecene; and dicyclohexylcarbodiimide may be added.

In general, the reaction time is several seconds to 24 hours. After the reaction, the obtained amino group-modified ethylene-α-olefin copolymer can be purified by known purification methods such as solvent extraction and reprecipitation.

In a case where a terminal acid-modified ethylene-α-olefin copolymer is used as the acid-modified ethylene-α-olefin copolymer, a terminal amino group-modified ethylene-α-olefin copolymer can be obtained. In a case where an in-chain acid-modified ethylene-α-olefin copolymer is used as the acid-modified ethylene-α-olefin copolymer, an in-chain amino group-modified ethylene-α-olefin copolymer can be obtained.

Method of Producing Functionalized Hydrogenated Conjugated Diene Polymer

Examples of a method of producing the functionalized hydrogenated conjugated diene polymer can include the following methods.

(Method 11) A production method including a step of hydrogenating a conjugated diene polymer to obtain a hydrogenated conjugated diene polymer and a step of modifying the hydrogenated conjugated diene polymer to obtain a functionalized hydrogenated conjugated diene polymer.

(Method 12) A production method including a step of synthesizing a conjugated diene polymer having a functional group to obtain a functionalized conjugated diene polymer and a step of hydrogenating the functionalized conjugated diene polymer to obtain a functionalized hydrogenated conjugated diene polymer.

Preferred examples of the functional group can include a hydroxyl group and an amino group. The hydroxyl group and the amino group may be protected by a protecting group such as a trialkylsilyl group. Examples of the protecting group can include a methyl group, methylthiomethyl group, a 2,2,2-trichloroethyl group, a 1-(2-chloroethoxy)ethyl group, a methoxymethyl group, a 1-ethoxyethyl group, a benzyloxymethyl group, a benzyl group, a p-methoxybenzyl group, a p-nitrobenzyl group, an acetyl group, a trichloroacetyl group, a trifluoroacetyl group, a methoxycarbonyl group, an ethoxycarbonyl group, a tert-butoxycarbonyl group, a trimethylsilyl group, a triethylsilyl group, a dimethylisopropylsilyl group, a tert-butyldimethylsilyl group, a dimethylethylsilyl group, a triisopurpyrsilyl group, a tert-butyldiphenylsilyl group, and a 2,5-dimethyl-2,5-disilahexane-2,5-diyl group. Among them, the trimethylsilyl group, the triethylsilyl group, or the tert-butyldimethylsilyl group is preferred in terms of functional group protection, release property after protection, and coupling reaction efficiency.

The amino group-modified hydrogenated conjugated diene polymer can be obtained by using a polymerization initiator having an amino group through a method described in JP-A-2006-299280. A precursor of the polymerization initiator having the amino group is required to be lithiated, for example, and it is preferable that an organic lithium compound used for lithiation is used in an amount of 2 equivalents or more with respect to the precursor of the polymerization initiator having the amino group from the viewpoints of polymerization activity and a content of a metal element in an obtained polymer.

Coupling Reaction Step

The coupling reaction step is a step of mixing a functionalized propylene polymer and a functionalized elastomer with each other and partially reacting them with each other to obtain a propylene polymer composition containing the component (C) as a reaction product of the functionalized propylene polymer and the functionalized elastomer, an unreacted functionalized propylene polymer as the component (A), and an unreacted functionalized elastomer as the component (B).

The step of mixing the functionalized propylene polymer and the functionalized elastomer with each other and partially reacting them with each other can be performed by dissolving or suspending a functionalized propylene polymer and a functionalized elastomer in a solvent under a heat or non-heat condition.

In the case of the propylene block copolymer in which the component (C) contains the segment (I) and the segment (II), the functionalized propylene polymer used in the coupling reaction step is a terminally functionalized propylene polymer, and the functionalized elastomer is a terminally functionalized elastomer.

In the case of the graft copolymer in which the component (C) contains the main chain composed of the segment (I) and the side chain composed of the segment (II), the functionalized propylene polymer used in the coupling reaction step is an in-chain functionalized propylene polymer, and the functionalized elastomer is a terminally functionalized elastomer.

In the case of the graft copolymer in which the component (C) contains the main chain composed of the segment (II) and the side chain composed of the segment (I), the functionalized propylene polymer used in the coupling reaction step is a terminally functionalized propylene polymer, and the functionalized elastomer is an in-chain functionalized elastomer.

A ratio of a use amount of the functionalized elastomer to a use amount of the functionalized propylene polymer is 0.5 or more and 3.0 or less, preferably 0.7 or more and 2.5 or less, and more preferably 0.8 or more and 2.0 or less, in terms of an equivalent ratio of the respective functional groups. The unreacted functionalized elastomer can be removed by purification as described below.

In the coupling reaction step, a specific example of the solvent used is the same as the solvent used in the production of the terminally functionalized propylene polymer. In general, a use amount of the solvent is 1 to 100-fold by weight with respect to a total amount of the functionalized propylene polymer and the functionalized elastomer used in the coupling reaction step.

In general, a reaction temperature in the coupling reaction step is 0° C. or higher and 300° C. or lower, preferably 10° C. or higher and 280° C. or lower, and more preferably 20° C. or higher and 250° C. or lower.

In order to promote the reaction between the functionalized propylene polymer and the functionalized elastomer, a dehydration condensing agent such as Bronsted acid catalysts such as sulfuric acid, methanesulfonic acid, and p-toluenesulfonic acid; Lewis acid catalysts such as aluminum chloride, tin chloride, iron chloride, titanium tetraisopropoxide, and dibutyltin laurate; amines such as triethylamine, tributylamine, pyridine, and diazabicycloundecene; and dicyclohexylcarbodiimide may be added. The use amount is not particularly limited.

In the coupling reaction step, a stabilizer such as an antioxidant may be used to prevent deterioration of the polymer. The stabilizers may be used alone or in combination of two or more thereof. A use amount of the stabilizer is not particularly limited, but in general, is 0.0001 to 0.01-fold by weight with respect to the total amount of the functionalized propylene polymer and the functionalized elastomer used in the coupling reaction step.

A lubricating material and/or neutralizing agent may be used to improve coupling reaction efficiency through ease of handling of the obtained polymer and neutralization of a reaction by-product. Examples of the lubricating material and/or neutralizing agent can include stearic acid, calcium stearate, zinc stearate, and erucic acid amide. A use amount of the lubricating material is not particularly limited, but in general, is 0.0001 to 0.1-fold by weight with respect to the total amount of the functionalized propylene polymer and the functionalized elastomer used in the coupling reaction step.

In general, a reaction time is 10 minutes to 48 hours.

An example of the coupling reaction step can include a method in which the mixing of the functionalized propylene polymer and the functionalized elastomer with each other is performed by melting and kneading.

Examples of the melt kneading apparatus can include a continuous type kneading apparatus such as a single screw extruder or a twin screw extruder, a batch type kneader such as a Bunbury mixer, and a heat roll.

A melting and kneading temperature is preferably 150° C. or higher and 300° C. or lower, more preferably 160° C. or higher and 280° C. or lower, and still more preferably 170° C. or higher and 250° C. or lower.

In general, a melting and kneading time is 10 seconds to 1 hour.

The other melting and kneading conditions are the same as those in the case of the coupling reaction using the solvent.

After the coupling reaction step, a step of separating and removing at least a part of the unreacted functionalized elastomer from the composition obtained in the coupling reaction step using known purification methods such as solvent extraction and reprecipitation may be provided.

The propylene polymer composition containing the component (A), the component (B), and the component (C) can implement excellent impact resistance of a heterophasic propylene polymer material. In addition, the propylene polymer composition can implement excellent heat resistance and rigidity of the heterophasic propylene polymer material.

Composition

When the heterophasic propylene polymer material and the propylene polymer composition are mixed with each other, it is possible to obtain a composition containing the following component (i) and the following component (ii), in which a number average particle size of a stained domain obtained by staining a cross section of the following test piece formed of the composition including a straight line parallel to a longitudinal direction and a straight line parallel to a thickness direction by vapor of ruthenium tetroxide is 0.050 to 1.20 µm, and a load deflection temperature of the following test piece measured under a condition of a load of 0.45 MPa according to a method defined by JIS K7191 is 65° C. or higher.

Component (i): a propylene polymer,

Component (ii): an ethylene-based copolymer, and

Test piece: a test piece of length 80 mm×width 10 mm×thickness 4 mm obtained by injection molding of the composition at a molding temperature of 220° C. and a mold temperature of 50° C.

The cross section is a cross section at the center in a width direction of the test piece as illustrated in FIG. 1.

The number average particle size of the stained domain obtained by staining the cross section of the test piece including the straight line parallel to the longitudinal direction and the straight line parallel to the thickness direction by vapor of ruthenium tetroxide is preferably 0.10 to 1.20 μm, and more preferably 0.50 to 1.16 μm.

The stained domain obtained by staining through vapor of ruthenium tetroxide is mainly formed of a component (xii) of a heterophasic propylene polymer material described below, and a portion which is not stained is mainly formed of a component (xi) of a heterophasic propylene polymer material described below.

The number average particle size of the stained domain obtained by staining through vapor of ruthenium tetroxide is calculated by analyzing an observation image of the cross section after the staining observed with a scanning electron microscope using an A image-kun (produced by Asahi Kasei Engineering Corporation, registered trademark). The observation image is observed to include the center of the test piece in the longitudinal direction and the thickness direction.

The composition is obtained by melting and kneading 0.1 to 20 wt % of the propylene polymer composition and 80 to 99.9 wt % of a heterophasic propylene polymer material described below, such that the number average particle size of the domain can be 0.05 to 1.20 μm. The number average particle size of the domain can be reduced by increasing the amount of the component (C) in the composition containing the component (i) and the following component (ii).

The load deflection temperature is preferably 77 to 160° C. and more preferably 77 to 100° C.

The composition is obtained by melting and kneading 0.1 to 20 wt % of the propylene polymer composition and 80 to 99.9 wt % of a heterophasic propylene polymer material described below, such that the load deflection temperature of the composition can be 65° C. or higher.

The component (i) is a propylene polymer containing a structural unit derived from propylene in an amount of 90 wt % or more with respect to a total weight of 100 wt % of the propylene polymer.

The component (ii) is an ethylene-α-olefin copolymer containing a structural unit derived from ethylene and a structural unit derived from an α-olefin having 3 to 10 carbon atoms, and a content of the structural unit derived from the ethylene is more than 10 wt % and 99 wt % or less with respect to a total weight of 100 wt % of the ethylene-α-olefin copolymer.

An example of the heterophasic propylene polymer material used to obtain the composition can include a component (D) described below.

It is considered that the component (i) in the composition is derived from the component (xi) in the component (D) and the component (A) in the propylene polymer composition.

It is considered that the component (ii) in the composition is derived from the component (xii) in the component (D) and the component (B) in the propylene polymer composition.

For example, the composition can be obtained by mixing the component (D) and the propylene polymer composition with each other by using the propylene polymer composition in an amount of 0.1 to 10 wt %, preferably 0.2 to 5 wt %, and more preferably 0.3 to 3 wt %, with respect to a total weight of 100 wt % of the component (D) and the propylene polymer composition.

In the composition, at least one of a content of a component insoluble in p-xylene at 25° C. in a polymer component and a content of a component insoluble in n-heptane at 25° C. in the polymer component is preferably 50 to 95 wt % with respect to a total weight of 100 wt % of the polymer component contained in the composition. For example, at least one of a content of CXIS in the polymer component contained in the composition and a content of CHIS in the polymer component contained in the composition can be 50 to 95 wt % by setting a total of a content of the component (xii) in the component (D) and a content of the component (B) to 5 to 50 wt % with respect to the total weight of 100 wt % of the polymer component contained in the composition.

The polymer component contained in the composition refers to the entire polymer contained in the composition, and examples thereof can include the heterophasic propylene polymer material, the component (A), the component (B), and the component (C).

Component (D)

The component (D) is a heterophasic propylene polymer material. The component (D) is a mixture including a component (xi) and a component (xii), and in general, is a mixture containing a structure in which a component (xii) is dispersed in a continuous phase of a component (xi).

Component (xi): a propylene polymer containing a structural unit derived from propylene in an amount of 90 wt % or more with respect to a total weight of 100 wt % of the propylene polymer Component (xii): an ethylene-α-olefin copolymer containing a structural unit derived from ethylene and a structural unit derived from an α-olefin having 3 to 10 carbon atoms, and a content of the structural unit derived from the ethylene is more than 10 wt % and 99 wt % or less with respect to a total weight of 100 wt % of the ethylene-α-olefin copolymer In general, the component (D) is a propylene polymer material containing a component (xi) and a component (xii) obtained by multi-stage polymerization.

Component (xi)

Examples of the component (xi) can include a propylene homopolymer and a random copolymer containing a structural unit derived from one or more olefins selected from the group consisting of ethylene and an α-olefin having 4 to 10 carbon atoms and a structural unit derived from propylene.

Examples of the α-olefin having 4 to 10 carbon atoms can include 1-butene, 1-hexene, 4-methyl-1-pentene, 1-octene, and 1-decene. The random copolymer may contain only one or two or more structural units derived from one or more olefins selected from the group consisting of ethylene and an α-olefin having 4 to 10 carbon atoms. The random copolymer is preferably an ethylene-propylene random copolymer.

The component (xi) is preferably a propylene homopolymer from the viewpoints of rigidity and heat resistance of an obtained molded article.

[η] of the component (xi) is preferably 0.1 to 5 dl/g, more preferably 0.3 to 4 dl/g, and more preferably 0.5 to 3 dl/g. [η] of the component (xi) is preferably 0.1 dl/g or more from the viewpoint of impact resistance or toughness of an obtained molded article. [η] of the component (xi) is preferably 5 dl/g or less from the viewpoint of moldability.

An isotactic pentad fraction [mmmm] of the component (xi) is preferably 0.95 or more, more preferably 0.97 or more, and still more preferably 0.98 or more, from the viewpoint of rigidity or heat resistance of an obtained molded article.

Component (xii)

The component (xii) is a random copolymer.

Examples of the α-olefin having 3 to 10 carbon atoms can include propylene, 1-butene, 1-hexene, 4-methyl-1-pentene, 1-octene, and 1-decene. The structural unit derived from the α-olefin contained in the component (xii) is preferably a structural unit derived from propylene, a structural unit derived from 1-butene, a structural unit derived from 1-hexene, or a structural unit derived from 1-octene, and more preferably a structural unit derived from propylene or a structural unit derived from 1-butene. The ethylene-α-olefin copolymer may contain only one or two or more structural units derived from an α-olefin having 3 to 10 carbon atoms.

The component (xii) is preferably an ethylene-propylene copolymer.

A content of the structural unit derived from the ethylene contained in the component (xii) is preferably more than 10 wt % and 90 wt % or less, more preferably 15 wt % or more and 80 wt % or less, and still more preferably 20 wt % or more and 75 wt % or less, from the viewpoint of impact resistance of an obtained molded article.

A melt flow rate (hereinafter, referred to as MFR) of the component (D) measured under conditions of a temperature of 230° C. and a load of 21.18 N is preferably 2 to 150 g/10 min and more preferably 15 to 130 g/10 min. The MFR is a value measured under conditions of a temperature of 230° C. and a load of 21.18 N according to a method defined by JIS K7210.

The MFR of the component (D) is preferably 2 g/10 min or more from the viewpoint of molding processability. The MFR of the component (D) is preferably 150 g/10 min or less from the viewpoints of impact resistance and toughness of an obtained molded article.

A content of the component (xii) contained in the component (D) is preferably 1 to 49 wt %, more preferably 5 to 45 wt %, and still more preferably 10 to 40 wt %, with respect to a total weight of 100 wt % of the component (D). A content of the component (xi) contained in the component (D) is preferably 51 to 49 wt %, more preferably 5 to 45 wt %, and still more preferably 10 to 40 wt %, with respect to the total weight of 100 wt % of the component (D).

An example of a method of producing the component (D) can include a production method including a step of polymerizing propylene in the presence of a propylene polymerization catalyst to obtain a component (xi) and a step of copolymerizing propylene or an α-olefin having 4 to 10 carbon atoms and ethylene in the presence of the component (xi) to obtain a component (D). The method is generally referred to as a "multi-stage polymerization method".

Examples of the propylene polymerization catalyst can include a Ziegler catalyst system, a Ziegler Natta catalyst system, a catalyst system formed of a transition metal compound of a group 4 of the periodic table having a cyclopentadienyl ring and alkylaluminoxane, and a catalyst system formed of a compound which reacts with a transition metal compound of a group 4 of the periodic table having a cyclopentadienyl ring to form an ionic complex and an organoaluminum compound.

Examples of these catalyst systems can include catalyst systems described in JP-A-61-218606, JP-A-61-287904, JP-A-5-194685, JP-A-7-216017, JP-A-9-316147, JP-A-10-212319, JP-A-2004-182981, JP-A-2009-173870, and JP-A-2013-147602.

In addition, a preliminary polymerization catalyst prepared by preliminarily polymerizing ethylene or an α-olefin in the presence of the catalyst system may be used.

Examples of a polymerization method can include bulk polymerization, solution polymerization, slurry polymerization, and gas phase polymerization. The bulk polymerization is a method of performing polymerization using a liquid olefin as a medium at a polymerization temperature, both the solution polymerization and the slurry polymerization are method of performing polymerization in an inactive hydrocarbon solvent such as propane, butane, isobutene, pentane, hexane, heptane, or octane, and the gas phase polymerization is a method in which a gaseous monomer is used as a medium and a gaseous monomer is polymerized in the medium. These polymerization methods may be used in any of a batch manner and a continuous manner, and these polymerization methods may be used in arbitrary combination. A production method by a bulk-gas phase polymerization method in which a continuous type gas phase polymerization method, a bulk polymerization method, and a gas polymerization method are continuously performed is preferred from the viewpoints of industrial and cost-effective points.

Various conditions (polymerization temperature, polymerization pressure, monomer concentration, injection amount of catalyst, polymerization time, and the like) in the polymerization step may be appropriately determined.

The composition may further contain the following propylene polymer and elastomer.

Examples of the propylene polymer which may be further contained can include a propylene homopolymer and a propylene-α-olefin random copolymer containing a structural unit derived from one or more α-olefins selected from the group consisting of ethylene and an α-olefin having 4 to 10 carbon atoms and a structural unit derived from propylene.

Examples of the α-olefin having 4 to 10 carbon atoms can include 1-butene, 1-hexene, 4-methyl-1-pentene, 1-octene, and 1-decene. The propylene-α-olefin random copolymer is preferably a propylene-ethylene random copolymer. A content of the structural unit derived from the propylene contained in the propylene-α-olefin random copolymer is preferably 90 wt % or more, and more preferably 95 wt % or more, with respect to a total weight of 100 wt % of the propylene-α-olefin random copolymer, from the viewpoints of rigidity and heat resistance of an obtained molded article.

In addition, [η] of the propylene polymer which may be contained is preferably 0.1 to 5 dl/g, more preferably 0.5 to 3 dl/g, and still more preferably 0.7 to 2 dl/g.

Examples of the elastomer which may be further contained can include at least one elastomer selected from the group consisting of an olefin-based elastomer and a vinyl aromatic compound elastomer.

The olefin-based elastomer is a copolymer containing a structural unit derived from ethylene and a structural unit derived from an α-olefin having 4 or more and 20 or fewer carbon atoms. A content of the structural unit derived from the ethylene in the olefin-based elastomer is preferably 50 wt % or more with respect to a total of 100 wt % of the content of the structural unit derived from the ethylene and a content of the structural unit derived from the α-olefin having 4 or more and 20 or fewer carbon atoms.

Examples of the α-olefin having 4 or more carbon atoms and 20 or fewer carbon atoms can include 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene, and 1-dodecene. These α-olefins may be used alone or in combination of two or more thereof.

A density of the olefin-based elastomer measured according to JIS K7112, which is preferably 1-butene, 1-hexene, or 1-octene, is preferably 0.85 g/cm$^3$ or more and 0.885 g/cm$^3$ or less, more preferably 0.85 g/cm$^3$ or more and 0.88 g/cm$^3$ or less, and still more preferably 0.855 g/cm$^3$ or more and 0.875 g/cm$^3$ or less, from the viewpoint of impact resistance of a molded article containing the composition.

An MFR of the olefin-based elastomer measured under conditions of a temperature of 190° C. and a load of 21.18 N is preferably 0.05 to 200 g/10 min, more preferably 0.1 to 150 g/10 min, still more preferably 0.2 to 100 g/10 min, and further still more preferably 0.3 to 80 g/10 min, from the viewpoint of impact resistance of a molded article containing the composition.

An example of a method of producing the olefin-based elastomer can include a production method using a polymerization catalyst. Examples of the polymerization catalyst can include a Ziegler Natta catalyst formed of a vanadium compound, an organoaluminum compound, and a halogenated ester compound; a catalyst obtained by combining alumoxane or a boron compound with a metallocene compound in which at least one group having a cyclopentadienyl anion skeleton is coordinated to a titanium atom, a zirconium atom, or a hafnium atom; and a metallocene catalyst.

Examples of a polymerization method can include a method of copolymerizing ethylene and an α-olefin in an inactive organic solvent such as a hydrocarbon compound; and a method of copolymerizing ethylene and α-olefin without a solvent.

In addition, a commercially available corresponding product may be used. Examples of the commercially available corresponding product can include Engage (registered trademark) series manufactured by The Dow Chemical Company and a TAFMER (registered trademark) series manufactured by Mitsui Chemicals, Inc.

The vinyl aromatic compound elastomer is an elastomer containing a structural unit derived from a vinyl aromatic compound. Examples of the vinyl aromatic compound elastomer can include a block polymer containing a structural unit derived from a vinyl aromatic compound and a structural unit derived from conjugated diene and a block polymer in which a double bond of a conjugated diene part of the block copolymer is hydrogenated. As the vinyl aromatic compound elastomer, a block polymer in which a double bond of a conjugated diene part of a block copolymer is hydrogenated, the block copolymer containing a structural unit derived from a vinyl aromatic compound and a structural unit derived from conjugated diene, is preferred, a block polymer in which a double bond of a conjugated diene part of a block copolymer is hydrogenated in an amount of 80% or more is more preferred, and a block polymer in which a double bond of a conjugated diene part of a block copolymer is hydrogenated in an amount of 85% or more is still more preferred. These α-olefins may be used alone or in combination of two or more thereof.

An example of the vinyl aromatic compound in the vinyl aromatic compound elastomer can include styrene. Examples of the block polymer containing the structural unit derived from the vinyl aromatic compound and the structural unit derived from the conjugated diene can include a styrene-ethylene-butene-styrene-based elastomer, a styrene-ethylene-propylene-styrene-based elastomer, a styrene-butadiene-based elastomer, a styrene-butadiene-styrene-based elastomer, and a styrene-isoprene-styrene-based elastomer.

A content of the structural unit derived from the vinyl aromatic compound in the vinyl aromatic compound elastomer is preferably 10 wt % or more and 70 wt % or less, more preferably 11 wt % or more and 50 wt % or less, and still more preferably 12 wt % or more and 30 wt % or less, with respect to a total amount of 100 wt % of the vinyl aromatic compound elastomer.

A density of the vinyl aromatic compound elastomer measured according to JIS K7112 is preferably 0.88 g/cm$^3$ or more and 0.99 g/cm$^3$ or less, more preferably 0.88 g/cm$^3$ or more and 0.94 g/cm$^3$ or less, and still more preferably 0.89 g/cm$^3$ or more and 0.91 g/cm$^3$ or less, from the viewpoint of impact resistance of a molded article containing the composition.

An MFR of the vinyl aromatic compound elastomer measured according to JIS K6758 under conditions of a temperature of 230° C. and a load of 21.2 N is preferably 0.1 g/10 min or more and 15 g/10 min or less and more preferably 1 g/10 min or more and 13 g/10 min or less. Mw/Mn of the vinyl aromatic compound elastomer is preferably 2.5 or less and more preferably 2.3 or less. Mn and Mw of the vinyl aromatic compound elastomer are measured by a GPC method.

An example of a method of producing the vinyl aromatic compound elastomer can include a method of polymerizing conjugated diene, a vinyl aromatic compound, and if necessary, an olefin, in a hydrocarbon solvent.

In addition, a commercially available corresponding product may be used. Examples of a commercially available corresponding product can include Kraton (registered trademark) series manufactured by Kraton Polymers LLC, Septon (registered trademark) manufactured by Kuraray Co., Ltd., Dynalon (registered trademark) manufactured by JSR Corporation, and Taftec (registered trademark) manufactured by Asahi Kasei Corporation.

In a case where the composition further contains an elastomer, a content of the elastomer is preferably 1 to 40 wt %, more preferably 3 to 30 wt %, and still more preferably 5 to 25 wt %, with respect to a total amount of 100 wt % of the composition. The composition may contain only one or two or more elastomers.

In the case where the composition contains an elastomer, a total of a content of the component (xii) in the component (D), a content of the component (B) in the propylene polymer composition, a content of the segment (II), and a content of the elastomer is preferably 5 to 50 wt %, more preferably 5 to 45 wt %, still more preferably 10 to 40 wt %, and further still more preferably 15 to 35 wt %, with respect to the total weight of 100 wt % of the composition, from the viewpoints of rigidity, heat resistance, and impact resistance.

Inorganic Filler

The composition may further contain an inorganic filler.

Examples of a shape of the inorganic filler can include a powder shape, a flake shape, a granular shape, and a fibrous shape.

Specific examples of the inorganic filler having a powder, flake, or granular shape can include talc, mica, calcium carbonate, barium sulfate, magnesium carbonate, clay, alumina, silica, calcium sulfate, silica sand, carbon black, titanium oxide, magnesium hydroxide, zeolite, molybdenum, diatomaceous earth, sericite, volcanic soil, calcium hydroxide, calcium sulfite, sodium sulfate, bentonite, and graphite.

In addition, specific examples of the inorganic filler having a fibrous shape can include fibrous magnesium oxysulfate, potassium titanate fiber, magnesium hydroxide fiber, aluminum borate fiber, calcium silicate fiber, calcium carbonate fiber, carbon fiber, glass fiber, and metal fiber.

The composition may contain only one or two or more inorganic fillers. The inorganic filler is preferably talc or fibrous magnesium oxysulfate.

In a case where the composition contains an inorganic filler, a content of the inorganic filler in the composition is preferably 1 to 40 wt %, more preferably 2 to 35 wt %, and still more preferably 5 to 30 wt %, with respect to the total weight of 100 wt % of the composition.

An MFR of the composition measured under conditions of a temperature of 230° C. and a load of 21.18 N is preferably 1 to 200 g/10 min, more preferably 2 to 150 g/10 min, still more preferably 5 to 100 g/min, and further still more preferably 10 to 70 g/min, from the viewpoint of molding processability or impact resistance.

A method of producing the composition is not particularly limited, but preferably includes a step of feeding the propylene polymer composition and the component (D), and if necessary, the elastomer or the inorganic filler, to a melt kneading apparatus, and a step of melting and kneading the propylene polymer composition, the component D, and the like by the melt kneading apparatus.

Examples of the melt kneading apparatus used for the mixing and kneading can include a single screw extruder, a twin screw extruder, a Bunbury mixer, and a heat roll. A melting and kneading temperature is preferably 170 to 250° C., and a heat treatment time is preferably 10 seconds to 20 minutes. In addition, the respective components may be melted and kneaded at the same time or may be separately melted and kneaded. For example, predetermined amounts of the respective components in the composition may be weighed and the respective components are uniformly and preliminarily mixed with each other in a tumbler or the like and then the preliminary mixture may be melted and kneaded, or the respective components may be directly fed by a feeder and melted and kneaded.

The composition may be molded to form a molded article. Examples of an application of the molded article can include vehicle parts such as vehicle interior and exterior parts, two wheel vehicle parts, food packages, and parts of furniture and electrical products. The molded article can be suitably used for vehicle parts and food packages, and can be more suitably used for vehicle parts. Examples of the vehicle exterior parts can include a bumper, a fender, and a wheel cover, examples of the vehicle interior parts can include an instrumental panel, a trim, a door panel, a side protector, a console box, and a column cover, and examples of the two wheel vehicle parts can include a cowling and a muffler cover.

The molded article formed of the composition is also excellent in rigidity.

EXAMPLES

A measurement value in each item in the detailed description, examples, and comparative examples of the invention were measured by the following methods.

Average molecular weight (unit: none) and molecular weight distribution (unit: none)

Mw and Mn were measured by GPC under the following conditions. Mw/Mn was calculated as a ratio of Mw to Mn.

(1) Measurement of CXIS in Maleic Anhydride-Modified Polypropylene or Propylene Polymer Composition GPC apparatus: 150 C type manufactured by Millipore Waters Co.

Column: TSK-GEL GMH-HT 7.5×600×2 columns
Measurement temperature: 140° C., 152° C.
Mobile phase: orthodichlorobenzene
Sample concentration: 5 mg/5 mL (2) Measurement of CXS in Amino Group-Modified Hydrogenated Polybutadiene or Propylene Polymer Composition First, relative molecular weights and absolute molecular weights of a plurality of hydrogenated polybutadienes having different molecular weights were determined in the same manner as that of (1) above and a GPC-MALS method, respectively, to create a calibration curve.

Next, a relative number average molecular weight and a relative weight average molecular weight of a hydrogenated polybutadiene sample were measured by gel permeation chromatography. The following conditions were applied for the measurement.

GPC apparatus: LC-20AC, DGU-20A3, SIL-20A HT, CTO-20A, RID-10A, and CBM-20A, manufactured by Shimadzu Corporation Column: PLgel Individual PoreSize PL1110-6550 and PL1110-6160, manufactured by Agilent Technologies, Inc.
Column temperature: 40° C.
Mobile phase: tetrahydrofuran (containing 1 wt % of 2-(ethylamino) ethanol)
Flow rate: 1.0 mL/min
Detector: differential refractive index detector
Detector cell temperature: 40° C.
Sample concentration: 1 mg/mL
Sample injection amount: 100 µL The calculated relative number average molecular weight and relative weight average molecular weight were converted to absolute values using the calibration curve to calculate Mn and Mw.

Since CXS in the propylene polymer composition of each of Example 2 and Example 5 is derived from amino group-modified hydrogenated polybutadiene, it is considered that Mn of the CXS in the propylene polymer composition is the same as Mn of the amino group-modified hydrogenated polybutadiene.

Melting point (Tm) (unit: ° C.)

An aluminum pan in which about 5 mg of a sample was sealed was (1) kept at 220° C. for 5 minutes, (2) cooled from 220° C. to −90° C. at a rate of 10° C./min, (3) heated from −90° C. to 220° C. at a rate of 10° C./min, (4) cooled from 220° C. to −90° C. at a rate of 10° C./min, (5) kept at −90° C. for 5 minutes, and (6) heated from −90° C. to 60° C. at a rate of 2° C./min (modulation amplitude: ±0.16° C., modulation period: 30 seconds), under a nitrogen atmosphere, with a heat analysis apparatus (differential scanning calorimeter Q100, manufactured by TA Instruments, Inc.).

A differential scanning calorimetry curve obtained by the calorimetry in the step (3) was analyzed by a method according to JIS K7121-1987 to obtain a top temperature of the resulting melting peaks, and the top temperature of the resulting melting peaks was defined as a melting point.

Content (unit: wt %) of structural unit derived from ethylene contained in ethylene-propylene copolymer, content (unit: wt %) of structural unit derived from ethylene contained in propylene polymer composition, content (unit: wt %) of ethylene-propylene copolymer contained in propylene polymer composition, content (unit: wt %) of structural unit derived from ethylene contained in component (D), and content (unit: wt %) of component (xii) contained in component (D)

A $^{13}$C-NMR spectrum was measured by a nuclear magnetic resonance spectroscope under measurement conditions shown below. The $^{13}$C-NMR spectrum was analyzed according to a method described in Macromolecules, No. 15, 1150 page to 1152 page, 1982.

Apparatus: AVANCE600 manufactured by Bruker Corporation, 10 mm cryoprobe
Measurement temperature: 130° C.
Measurement method: proton decoupling method
Pulse width: 45 degrees
Pulse repeating time: 4 seconds
Chemical shift value standard: tetramethylsilane
Number of short chain branches of hydrogenated polybutadiene other than methyl group (unit: number/1,000 C)

A $^1$H-NMR spectrum of the hydrogenated polybutadiene was measured under measurement conditions shown below. (A), (B), (C), (D) and the number of short chain branches were calculated by the following equations from integrated values of signals in (a) of a region of 0.7 to 1.0 ppm, (b) of a region of 1.1 to 1.6 ppm, (c) of a region of 5.0 to 5.2 ppm, and (d) of a region of 5.2 to 5.5 ppm.

$$(A)=(a)/3-(c)$$

$$(B)=((b)-(A)\times 5)/8$$

$$(C)=(c)$$

$$(D)=(d)/2$$

Molar ratio (%) of 1,2-bond monomer unit=$((A)+(C))/((A)+(B)+(C)+(D))\times 100$ Number of short chain branches (number/1,000 C)=$5\times$"molar ratio of 1,2-bond monomer unit"

Apparatus: nuclear magnetic resonance apparatus (JNM-AL400, manufactured by JEOL Ltd.)
Measurement solvent: heavy chloroform
Measurement temperature: 35° C.
Sample concentration: 40 mg/mL
Introduction amount (unit: mmol/g) of succinic anhydride residue in maleic anhydride-modified polypropylene In the $^1$H-NMR spectrum, an integrated value of a signal of a methine proton and/or a methylene proton of a succinic anhydride site generated by modification of maleic anhydride in the region of 2.40 to 3.40 ppm was compared with an integrated value of a signal of a proton in an alkane region, and a content of a succinic anhydride residue in the maleic anhydride-modified polypropylene was calculated.

Content (unit: mmol/g) of amino group

In the $^1$H-NMR spectrum, a content of an amino group in the amino group-modified hydrogenated polybutadiene was calculated by comparing an integrated value of a signal of a methylene proton adjacent to the amino group in a region (in a case where 4-(N,N-bis(trimethylsilyl)aminomethyl)phenyllithium was used as a polymerization initiator) of 4.10 to 4.00 ppm with the integrated value of the signal of the proton in the alkane region.

Hydrogenation Rate (Unit: %) of Hydrogenated Polybutadiene

In the $^1$H-NMR spectrum measured by the above-described method, a hydrogenation rate (%) was calculated from the integrated value of each signal as $((A)+(B))/((A)+(B)+(C)+(D))\times 100(\%)$.

Intrinsic viscosity (unit: dl/g)

A reduced viscosity was measured at three points of concentrations of 0.1, 0.2, and 0.5 g/dl under conditions of use of a tetralin solvent and a temperature of 135° C. using an Ubbelohde type viscometer. Next, the reduced viscosity was plotted against the concentration according to a calculation method described in "Polymer solution, Polymer experiment 11" (published by Kyoritsu Shuppan Co., Ltd., 1982) p. 491, and an intrinsic viscosity was calculated by an extrapolation method of extrapolating the concentration to zero.

Intrinsic viscosity of component (xi) contained in component (D): $[\eta]_{xi}$ (unit: dl/g)

An intrinsic viscosity ($[\eta]_{xi}$) of the component (xi) contained in the component (D) was measured by removing the component (xi) from a polymerization tank after a step of obtaining the component (xi) as a first step in the production of the component (D) according to the method.

Intrinsic viscosity of component (xii) contained in component (D): $[\eta]_{xii}$ (unit: dl/g)

The intrinsic viscosity ($[\eta]_{xi}$) of the component (xi) and an intrinsic viscosity ($[\eta]_M$) of the entire component (D) were measured. A weight ratio (X) of the component (xii) to the entire component (D), $[\eta]_{xi}$, and $[\eta]_M$ were substituted into the following equations, and an intrinsic viscosity ($[\eta]_{xii}$) of the ethylene-based copolymer contained in the component (D) was calculated. (The weight ratio (X) of the component (xii) was calculated by the above-described method.)

$$=[\eta]_M/X-(1/X-1)\,[\eta]_i$$

$[\eta]_{xi}$: intrinsic viscosity (dL/g) of component (xi)
$[\eta]_M$: intrinsic viscosity (dL/g) of entire component (D)
Content (unit: wt %) of component (C)

A content y (wt %) of the component (C) contained in the propylene polymer composition was calculated as follows.

$$y=z\times E_{IS}\times\{(Mn_{(I)}+Mn_{(II)})/Mn_{(II)}\} \qquad (3)$$

z: content (wt %) of CXIS or CHIS with respect to total weight of 100 wt % of propylene polymer composition
$E_{IS}$: content (wt %) of segment (II) contained in CXIS or CHIS with respect to the weight of 100 wt % of CXIS or CHIS of propylene polymer composition
$Mn_{(I)}$: Mn of segment (I) of component (C)
$Mn_{(II)}$: Mn of segment (II) of component (C) or Mn of CXS or CHS of propylene polymer composition
$Mn_{(I)}+Mn_{(II)}$ was calculated in the same manner as that of Mn of the CXIS of the propylene polymer composition.

MFR (unit: g/10 min)

A melt flow rate (MFR) was measured under conditions of a temperature of 230° C. and a load of 21.18 N by the method defined by JIS K7210.

Method of molding test piece for evaluating physical properties

Injection molding was performed using a SI-30111 type injection molding machine manufactured by TOYO MACHINERY & METAL CO., Ltd. at a molding temperature of 220° C. and a mold temperature of 50° C. to obtain a test piece of length 80 mm×width 10 mm×thickness 4 mm for evaluating physical properties.

Bending modulus (unit: MPa)

A bending modulus of the test piece for evaluating physical properties was measured according to a method defined by JIS K7203 under conditions of a measurement temperature of 23° C. and a bending load rate of 2.0 mm/min.

Izod impact strength (unit: KJ/m$^2$)

The test piece for evaluating physical properties was notched, and Izod impact strength of the notched test piece was measured according to a method defined by JIS K7110 under a condition of a measurement temperature of 23° C.

Load deflection temperature (unit: ° C.)

A load deflection temperature of the test piece for evaluating physical properties was measured according to a method defined by JIS K7191 under a condition of a load of 0.45 MPa.

Content (unit: wt. ppm) of ash

Measurement of a content of ash was performed by the following method based on JIS K7250-1.

A sample (standard condition: 30 g) was fired in an electric furnace (model TFD-20C-Z, manufactured by TT-Labo Co., LTD.), and the sample was heated until a residue became a constant weight (standard condition: at 800° C. for 60 minutes). The residue was removed from the electric furnace and cooled in a desiccator for about 1 hour until the temperature reached room temperature. Thereafter, the residue was weighed and the content (wt. ppm) of the ash was calculated by the following equation.

Content (wt. ppm) of ash=(weight of residue/weight of sample before firing)×$10^6$ Content (unit: wt. ppm) of zinc element A sample was thermally pressed at 190° C. and then cooled to prepare a sheet having a thickness of 4 mm for measurement. Fluorescent X-rays of the sheet for measurement were measured by a fluorescent X-ray analysis device (ZSX Primus II, manufactured by Rigaku Corporation) based on JIS K0119 under the following conditions.

Separately, a calibration curve was prepared by calculating a relationship between a concentration of the zinc element and an intensity of X-rays by using a sample for a calibration curve. A content of the zinc element in the sheet for measurement was calculated based on the calibration curve.

Condition

Measurement atmosphere: vacuum

X-ray target: ruthenium

Detector: proportional counter tube (PC), scintillation counter (SC)

Standard sample: polymer application package, manufactured by Rigaku Corporation Number average particle size (unit: μm) of domain A cross section of the test piece for evaluating physical properties including a straight line parallel to a longitudinal direction of the test piece and a straight line parallel to a thickness direction of the test piece was taken out using an ultramicrotome to stain the cross section by vapor of ruthenium tetroxide. An overstained layer was removed from the stained cross section using the ultramicrotome to expose a flat cross section. In order to prevent static electricity, the obtained test piece was subjected to platinum and palladium vapor deposition to obtain an observation test piece. The stained cross section was observed with a scanning electron microscope (JSM-7600F) to obtain an observation image from a reflected electron image. The observation image was analyzed by image analysis software (A image-kun, registered trademark, produced by Asahi Kasei Engineering Corporation) and a number average particle size of the entire stained domain present in the observation image was calculated. At the time of the image analysis, the observation image was binarized by a threshold value, and a "bright part" was defined as a "stained domain" and was converted to an equivalent circle diameter.

Thermal decomposition point (unit: ° C.)

A temperature (thermal decomposition point) at which a mass of 0.5 wt % was reduced was measured using a differential thermal/thermogravimetry simultaneous analyzer (TG/DTA-6200, manufactured by SII Nanotechnology Inc.) based on JIS K7120 under the following conditions.

The higher the value of the thermal decomposition point, the better the thermal decomposition resistance.

Condition

Temperature: from room temperature to 550° C.

Heating rate: 10° C./min

Atmosphere: under air

Component (D)

A heterophasic propylene polymer material (D-1) containing the component (xi) and the component (xii) was synthesized using a Ziegler Natta catalyst. A structure of (D-1) is shown in Table 1.

In Table 1, $[\eta]_{xi}$ represents an intrinsic viscosity of the component (xi), $[\eta]_{xii}$ represents an intrinsic viscosity of the component (xii), the "content of (xii)" represents a content of the component (xii) contained in the heterophasic propylene polymer material, and the "$C2_{xii}$" represents a content of a structural unit derived from ethylene contained in the component (xii).

TABLE 1

| Component (D) | $[\eta]_{xi}$ (dL/g) | $[\eta]_{xii}$ (dL/g) | (xii) Content (wt %) | $C2_{xii}$ (wt %) |
|---|---|---|---|---|
| D-1 | 0.92 | 2.68 | 31.4 | 55.4 |

Synthesis of in-Chain Maleic Anhydride-Modified Polypropylene

Synthesis Example 1

100 parts by weight of a propylene homopolymer having an MFR of 0.5 g/10 min, which was synthesized with a Ziegler Natta catalyst, 1.0 part by weight of maleic anhydride, 1.0 part by weight of an organic peroxide diluted mixture (obtained by diluting bis(tert-butylperoxyisopropyl)benzene) (PERKADOX 14, produced by Kayaku Akzo Corporation) with polypropylene powder so that a content of the bis(tert-butylperoxyisopropyl)benzene) was 8 wt %), 0.2 parts by weight of an antioxidant (Irganox 1010 (produced by Ciba Specialty Chemicals, Inc.)), and 0.2 parts by weight of an antioxidant (Irgafos 168 (produced by Ciba Specialty Chemicals, Inc.)) were mixed with each other, and the mixture was melted and kneaded by a twin screw extruder (KZW-15, manufactured by TECHNOVEL, screw diameter: 15 mm, L/D=45, temperature: 200° C., rotation speed: 300 rpm, ejection: 2 kg/hr), to obtain in-chain maleic anhydride-modified polypropylene. The mixture was melted and kneaded once again while volatilizing the mixture from a vacuum vent by a twin screw extruder (KZW-15, manufactured by TECHNOVEL, screw diameter: 15 mm, L/D=45, temperature: 200° C., rotation speed: 300 rpm, ejection: 4 kg/hr), to obtain in-chain maleic anhydride-modified polypropylene (A-1). A content of a succinic anhydride residue was 0.0032 mmol/g. When the content of the succinic anhydride residue was calculated, a content of a structural unit derived from propylene contained in the in-chain maleic anhydride-modified polypropylene (A-1) was 99 wt % or more.

Synthesis Example 2

100 parts by weight of a propylene homopolymer having an MFR of 0.5 g/10 min, which was synthesized with a Ziegler Natta catalyst, 1.0 part by weight of maleic anhydride, 0.14 parts by weight of perbutyl P (organic peroxide, produced by NOF CORPORATION), 0.5 parts by weight of PERKADOX 24 (organic peroxide, produced by Kayaku Akzo Corporation), 0.05 parts by weight of calcium stearate, and 0.3 parts by weight of an antioxidant (Irganox 1010 (produced by Ciba Specialty Chemicals, Inc.)) were mixed with each other, and the mixture was melted and kneaded in the same manner as that of Synthesis Example 1, to obtain in-chain maleic anhydride-modified polypropylene (A-2). Mn was 67,600, Mw/Mn was 2.2, and a content of a succinic anhydride residue was 0.011 mmol/g. When the content of the succinic anhydride residue was calculated, a content of a structural unit derived from propylene contained in the in-chain maleic anhydride-modified polypropylene (A-2) was 99 wt % or more.

Synthesis Example 3

100 parts by weight of a propylene-ethylene copolymer having an MFR of 2 g/10 min and a content of a monomer unit derived from ethylene of 6 wt %, which was synthesized with a Ziegler Natta catalyst, 1.5 parts by weight of maleic anhydride, 1.5 parts by weight of an organic peroxide diluted mixture (obtained by diluting bis(tert-butylperoxyisopropyl) benzene) (PERKADOX 14, produced by Kayaku Akzo Corporation) with polypropylene powder so that a content of the bis(tert-butylperoxyisopropyl)benzene) was 8 wt %), 0.2 parts by weight of an antioxidant (Irganox 1010 (produced by Ciba Specialty Chemicals, Inc.)), and 0.2 parts by weight of an antioxidant (Irgafos 168 (produced by Ciba Specialty Chemicals, Inc.)) were mixed with each other, and the mixture was melted and kneaded in the same manner as that of Synthesis Method 1, to obtain in-chain maleic anhydride-modified polypropylene. 1.0 part by weight of calcium stearate was added, and then the mixture was melted and kneaded once again while volatilizing the mixture from a vacuum vent by a twin screw extruder (KZW-15, manufactured by TECHNOVEL, screw diameter: 15 mm, L/D=45, temperature: 200° C., rotation speed: 300 rpm, ejection: 4 kg/hr), to obtain in-chain maleic anhydride-modified polypropylene (A-3). A content of a succinic anhydride residue was 0.0047 mmol/g. When the content of the succinic anhydride residue was calculated, a content of a structural unit derived from propylene contained in the in-chain maleic anhydride-modified polypropylene (A-3) was 99 wt % or more.

Synthesis of Terminal Amino Group-Modified Hydrogenated Polybutadiene

Synthesis Example 4 p-Bromo-N,N-bis(trimethylsilyl)benzylamine (4.50 g, 13.6 mmol) was dissolved in di-n-butyl ether (9.5 mL) under a nitrogen atmosphere, and a hexane solution of n-butyllithium (1.55 M, 17.6 mL, 27.2 mmol, 2 equivalents with respect to p-bromo-N,N-bis(trimethylsilyl)benzylamine) was slowly added dropwise while cooling the solution in an ice bath. A solution temperature was completely increased and then the solution was heated at 30° C. and stirred for 6 hours to prepare a p-((N,N-bis(trimethylsilyl)amino)methyl) phenyllithium solution A (hereinafter, an initiator) having a concentration of 0.48 M.

An internal pressure of a 5 L autoclave was reduced, n-hexane (1,673 g) and butadiene (250 g) were introduced, a temperature was increased to 65° C., and tetrahydrofuran (2.0 mL) was added. Thereafter, an initiator solution A (37.8 mL) was introduced, and a polymerization reaction was performed until a decrease of the internal pressure was completely stopped while keeping an internal temperature at about 70° C. 3-Methyl-1-propanol (1.3 mL) was added, hydrogen (partial pressure: 1.0 MPa) was introduced, a toluene solution of a Tebbe's reagent (0.5 M, 0.5 mL) was added, and a hydrogenation reaction was initiated. Hydrogen was continuous fed during the hydrogenation reaction so that the partial pressure was kept at 0.80 MPa, and an internal temperature was maintained at about 70° C. Whenever hydrogen consumption was no longer observed, the toluene solution of the Tebbe's reagent was added, and the reaction was continued until the hydrogen consumption was no longer observed after the addition. A total use amount of the Tebbe's reagent solution was 6.0 mL. After the catalyst was inactivated by adding 3-methyl-1-propanol (1.3 mL), the hydrogen was removed, the autoclave was opened, a polymer was precipitated by adding ethanol, and drying was performed at 80° C. under reduced pressure, to obtain 167 g of terminal amino group-modified hydrogenated polybutadiene (B-1). Mn was 27,000, Mw/Mn was 1.16, a hydrogenation rate was 97.9%, the number of short chain branches other than a methyl group was 128 per 1,000 C, and a content of the amino group was 0.051 mmol/g.

When the number of short chain branches and the content of the amino group were calculated, a content of a structural unit derived from ethylene contained in the terminal amino group-modified hydrogenated polybutadiene (B-1) was 59 wt %.

Synthesis Example 5

A ratio of a use amount of butadiene to a use amount of an initiator solution A was set to 17.8 (butadiene (g)/initiator solution A (mL)), and synthesis was performed in the same manner as that of Synthesis Example 4, to obtain terminal amino group-modified hydrogenated polybutadiene (B-2). Mn was 98,900, Mw/Mn was 1.17, a hydrogenation rate was 97.0%, the number of short chain branches other than a methyl group was 121 per 1,000 C, and a content of the amino group was 0.018 mmol/g. When the number of short chain branches and the content of the amino group were calculated, a content of a structural unit derived from ethylene contained in the terminal amino group-modified hydrogenated polybutadiene (B-2) was 61 wt %.

Synthesis Example 6

A ratio of a use amount of butadiene to a use amount of an initiator solution A was set to 5.1 (butadiene (g)/initiator solution A (mL)), and synthesis was performed in the same manner as that of Synthesis Example 4, to obtain terminal amino group-modified hydrogenated polybutadiene (B-3). Mn was 28,500, Mw/Mn was 1.26, a hydrogenation rate was 96.3%, the number of short chain branches other than a methyl group was 125 per 1,000 C, and a content of the amino group was 0.056 mmol/g. When the number of short chain branches and the content of the amino group were calculated, a content of a structural unit derived from ethylene contained in the terminal amino group-modified hydrogenated polybutadiene (B-3) was 60 wt %.

Synthesis of Propylene Polymer Composition

Example 1

87 parts by weight of in-chain maleic anhydride-modified polypropylene (A-1), 13 parts by weight of terminal amino group-modified hydrogenated polybutadiene (B-3), 0.2 parts by weight of an antioxidant (SUMILIZER GA80, produced by Sumitomo Chemical Co., Ltd.), 0.2 parts by weight of an antioxidant (SUMILIZER GP, produced by Sumitomo Chemical Co., Ltd.), and 1.0 part by weight of calcium stearate were uniformly mixed with each other, and the mixture was melted and kneaded by a twin screw extruder (KZW-15, manufactured by TECHNOVEL, screw diameter: 15 mm, L/D=45, temperature: 220° C., rotation speed: 300 rpm, ejection: 2 kg/hr), to obtain a propylene polymer composition (E-1) in which a component (C) was a graft copolymer. The measurement results are shown in Tables 2 and 3.

Example 2

75 parts by weight of in-chain maleic anhydride-modified polypropylene (A-2), 25 parts by weight of terminal amino group-modified hydrogenated polybutadiene (B-1), 0.2 parts by weight of an antioxidant (SUMILIZER GA80, produced by Sumitomo Chemical Co., Ltd.), and 0.2 parts by weight of an antioxidant (SUMILIZER GP, produced by Sumitomo Chemical Co., Ltd.) were uniformly mixed with each other, and the mixture was melted and kneaded using a LABO PLASTOMILL (manufactured by TOYO SEIKI CO., LTD.) at a set temperature of 210° C. and a screw rotation speed of 80 rpm under a nitrogen atmosphere for 5 minutes, to obtain a propylene polymer composition (E-2) in which a component (C) was a graft copolymer. The measurement results are shown in Tables 2 and 3.

Example 3

55 parts by weight of in-chain maleic anhydride-modified polypropylene (A-2), 45 parts by weight of terminal amino group-modified hydrogenated polybutadiene (B-2), 0.2 parts by weight of an antioxidant (SUMILIZER GA80, produced by Sumitomo Chemical Co., Ltd.), and 0.2 parts by weight of an antioxidant (SUMILIZER GP, produced by Sumitomo Chemical Co., Ltd.) were uniformly mixed with each other, and the mixture was melted and kneaded using a twin screw extruder in the same manner as described above, to obtain a propylene polymer composition (E-3) in which a component (C) was a graft copolymer. The measurement results are shown in Tables 2 and 3.

Example 4

CXIS (E-4) was separated from the propylene polymer composition (E-3) obtained in Example 3.

Example 5

87 parts by weight of in-chain maleic anhydride-modified polypropylene (A-3), 13 parts by weight of terminal amino group-modified hydrogenated polybutadiene (B-3), 0.2 parts by weight of an antioxidant (SUMILIZER GA80, produced by Sumitomo Chemical Co., Ltd.), and 0.2 parts by weight of an antioxidant (SUMILIZER GP, produced by Sumitomo Chemical Co., Ltd.) were uniformly mixed with each other, and the mixture was melted and kneaded by a twin screw extruder (KZW-15, manufactured by TECHNOVEL, screw diameter: 15 mm, L/D=45, temperature: 220° C., rotation speed: 300 rpm, ejection: 2 kg/hr), to obtain a propylene polymer composition (E-5) in which a component (C) was a graft copolymer. The measurement results are shown in Tables 2 and 3.

TABLE 2

| Example | Melting point (° C.) | Intrinsic viscosity (dl/g) | Ash Content (wt. ppm) | Zinc Content (wt. ppm) | $E_{IS}$ (wt %) | (C) Content (wt %) | Mw/Mn |
|---|---|---|---|---|---|---|---|
| Example 1 (E-1) | 163 | 1.99 | 1000 | 51 | 6.1 | 30 | |
| Example 2 (E-2) | | 0.74 | 100 | 65 | 8.6 | 24 | 2.15 |
| Example 3 (E-3) | 160 | 0.98 | 600 | 83 | 21.9 | 17 | 1.78 |
| Example 5 (E-5) | 134 | 1.29 | 1000 | 53 | 7.7 | 36 | |

TABLE 3

| Example | Mn of CXIS | Mn of CXS | Mn of amino group-modified hydrogenated polybutadiene | Mn of CXIS/ Mn of CXS | Mn of CXIS/ Mn of amino group-modified hydrogenated polybutadiene |
|---|---|---|---|---|---|
| Example 1 (E-1) | 114000 | 33400 | 28500 | 3.41 | 4.00 |
| Example 2 (E-2) | 72000 | | 27000 | | 2.67 |
| Example 3 (E-3) | 79500 | 102000 | 98900 | 0.78 | 0.80 |
| Example 5 (E-5) | 134000 | | 28500 | | 4.70 |

Physical Property Evaluation of Composition

Example 6

82 parts by weight of a heterophasic propylene polymer material (D-1), 18 parts by weight of a propylene homopolymer having an MFR of 120 g/10 min, which was polymerized with a Ziegler Natta catalyst, 5 parts by weight of a propylene polymer composition (E-1), 0.1 parts by weight of SUMILIZER GA80 (produced by Sumitomo Chemical Co., Ltd.), 0.1 parts by weight of SUMILIZER GP (produced by Sumitomo Chemical Co., Ltd.), and 0.05 parts by weight of calcium stearate were uniformly mixed with each other, and the mixture was melted and kneaded by a twin screw extruder (KZW-15TW, manufactured by TECHNOVEL, L/D=45, temperature: 220° C., rotation speed: 300 rpm), to obtain pellets for evaluation. A test piece for evaluating physical properties was prepared by using the obtained pellets for evaluation. The measurement results of the obtained test piece for evaluating physical properties are shown in Table 4.

Example 7

Example 7 was performed in the same manner as that of Example 6 except that 10 parts by weight of the propylene polymer composition (E-1) was used. The measurement results of the obtained test piece for evaluating physical properties are shown in Table 4.

Example 8

85 parts by weight of a heterophasic propylene polymer material (D-1), 15 parts by weight of a propylene homopolymer having an MFR of 120 g/10 min, which was polymerized with a Ziegler Natta catalyst, 2 parts by weight of a propylene polymer composition (E-2), 0.1 parts by weight of SUMILIZER GA80 (produced by Sumitomo Chemical Co., Ltd.), 0.1 parts by weight of SUMILIZER GP (produced by Sumitomo Chemical Co., Ltd.), and 0.05 parts by weight of calcium stearate were uniformly mixed with each other, and the mixture was melted and kneaded by a twin screw extruder (KZW-15TW, manufactured by TECHNOVEL, L/D=45, temperature: 220° C., rotation speed: 300 rpm), to obtain pellets for evaluation. A test piece for evaluating physical properties was prepared by using the obtained pellets for evaluation. The measurement results of the obtained test piece for evaluating physical properties are shown in Table 4.

Example 9

Example 9 was performed in the same manner as that of Example 8 except that 5 parts by weight of the propylene polymer composition (E-3) was used instead of the propylene polymer composition (E-2). The measurement results of the obtained test piece for evaluating physical properties are shown in Table 4.

Example 10

Example 10 was performed in the same manner as that of Example 8 except that 2 parts by weight of the propylene polymer composition (E-4) was used instead of the propylene polymer composition (E-2). The measurement results of the obtained test piece for evaluating physical properties are shown in Table 4.

Example 11

83 parts by weight of a heterophasic propylene polymer material (D-1), 17 parts by weight of a propylene homopolymer having an MFR of 120 g/10 min, which was polymerized with a Ziegler Natta catalyst, 5 parts by weight of a propylene polymer composition (E-5), 0.1 parts by weight of SUMILIZER GA80 (produced by Sumitomo Chemical Co., Ltd.), 0.1 parts by weight of SUMILIZER GP (produced by Sumitomo Chemical Co., Ltd.), and 0.05 parts by weight of calcium stearate were uniformly mixed with each other, and the mixture was melted and kneaded by a twin screw extruder (KZW-15TW, manufactured by TECHNOVEL, L/D=45, temperature: 220° C., rotation speed: 300 rpm), to obtain pellets for evaluation. A test piece for evaluating physical properties was prepared by using the obtained pellets for evaluation. The measurement results of the obtained test piece for evaluating physical properties are shown in Table 4.

Comparative Example 1

Comparative Example 1 was performed in the same manner as that of Example 8 except that the propylene polymer composition (E-1) was not used. The measurement results of the obtained test piece for evaluating physical properties are shown in Table 4.

Comparative Example 2

Comparative Example 2 was performed in the same manner as that of Example 1 except that 80 parts by weight of a heterophasic propylene polymer material (D-1), 20 parts by weight of a propylene homopolymer having an MFR of 120 g/10 min, which was polymerized with a Ziegler Natta catalyst, 0.1 parts by weight of SUMILIZER GA80 (produced by Sumitomo Chemical Co., Ltd.), 0.1 parts by weight of SUMILIZER GP (produced by Sumitomo Chemical Co., Ltd.), and 0.05 parts by weight of calcium stearate were used as raw materials. The measurement results of the obtained test piece for evaluating physical properties are shown in Table 4.

TABLE 4

| Example | Bending modulus (MPa) | Izod impact strength (KJ/m$^2$) | Load deflection temperature (° C.) | Number average particle size of domain (μm) |
|---|---|---|---|---|
| Example 6 | 982 | 44.3 | 77 | 1.16 |
| Example 7 | 1026 | 45.9 | 78 | 0.82 |
| Example 8 | 908 | 27.7 | 79 | 0.90 |

TABLE 4-continued

| Example | Bending modulus (MPa) | Izod impact strength (KJ/m$^2$) | Load deflection temperature (° C.) | Number average particle size of domain (μm) |
|---|---|---|---|---|
| Example 9 | 870 | 45.7 | 76 | 1.05 |
| Example 10 | 871 | 36.7 | 78 | 0.80 |
| Example 11 | 928 | 45.7 | 75 | 0.95 |
| Comparative Example 1 | 884 | 14.9 | 76 | 1.21 |
| Comparative Example 2 | 941 | 12.8 | 75 | 1.54 |

Thermal decomposition resistance evaluation of propylene polymer composition

Example 12

99.9 parts by weight of a propylene polymer composition (E-1), 0.2 parts by weight of SUMILIZER GA80 (produced by Sumitomo Chemical Co., Ltd.), 0.2 parts by weight of SUMILIZER GP (produced by Sumitomo Chemical Co., Ltd.), and 0.1 parts by weight of zinc stearate were uniformly mixed with each other, and the mixture was melted and kneaded by a twin screw extruder (Xplore, manufactured by DSM, temperature: 210° C., rotation speed: 100 rpm, kneading time: 5 minutes, under nitrogen circulation), to obtain pellets (E-6) for evaluation. The results of measuring a content of ash, a content of a zinc element, and a thermal decomposition point using the obtained pellets for evaluation are shown in Table 5.

Example 13

Example 13 was performed in the same manner as that of Example 12 except that 99.5 parts by weight of the propylene polymer composition (E-1) and 0.5 parts by weight of zinc stearate were used. The measurement results of the obtained pellets (E-7) for evaluation are shown in Table 5.

Example 14

Example 14 was performed in the same manner as that of Example 12 except that 98.9 parts by weight of the propylene polymer composition (E-1) and 1.1 parts by weight of zinc stearate were used. The measurement results of the obtained pellets (E-8) for evaluation are shown in Table 5.

Example 15

Example 15 was performed in the same manner as that of Example 12 except that 97.9 parts by weight of the propylene polymer composition (E-1) and 2.1 parts by weight of zinc stearate were used. The measurement results of the obtained pellets (E-9) for evaluation are shown in Table 5.

TABLE 5

| Example | Ash Content (wt. ppm) | Zinc Content (wt. ppm) | Thermal decomposition point (° C.) |
|---|---|---|---|
| Example 1 (E-1) | 1000 | 51 | 285 |
| Example 12 (E-6) | 1700 | 26 | 286 |
| Example 13 (E-7) | 2700 | 310 | 282 |
| Example 14 (E-8) | 2800 | 680 | 278 |
| Example 15 (E-9) | 3900 | 1400 | 277 |

DESCRIPTION OF REFERENCE SIGNS

1 Longitudinal direction
2 Width direction
3 Thickness direction
4 Cross section

INDUSTRIAL APPLICABILITY

According to the present invention, a propylene polymer composition capable of implementing a molded article having excellent impact resistance can be provided.

The invention claimed is:

1. A propylene polymer composition comprising the following components (A), (B) and (C), satisfying all of the following requirements (1) to (5),
   Component (A): a propylene polymer containing a structural unit derived from propylene in an amount of 90 wt % or more with respect to a total weight of 100 wt % of the propylene polymer;
   Component (B): at least one polymer selected from the group consisting of an ethylene-α-olefin copolymer and a hydrogenated conjugated diene polymer, wherein the ethylene-α-olefin copolymer is a copolymer containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer;
   Component (C): a propylene block copolymer or graft copolymer containing the following segment (I) and the following segment (II),
   Segment (I): a propylene polymer segment containing a structural unit derived from propylene in an amount of 90 wt % or more with respect to a total weight of 100 wt % of the propylene polymer segment; and
   Segment (II): at least one segment selected from the group consisting of an ethylene-α-olefin copolymer segment and a hydrogenated conjugated diene polymer segment, wherein
   the ethylene-α-olefin copolymer segment is a segment containing a structural unit derived from ethylene and a structural unit derived from an α-olefin having 3 to 10 carbon atoms, and the structural unit derived from the ethylene is contained in an amount of more than 10 wt % and 99 wt % or less with respect to a total weight of 100 wt % of the ethylene-α-olefin copolymer segment;
   Requirement (1): an intrinsic viscosity of the propylene polymer composition is 0.5 dl/g or more;
   Requirement (2): at least one of a number average molecular weight in terms of polystyrene of the following CXIS and a number average molecular weight in terms of polystyrene of the following CHIS is 40,000 or more, CXIS: a component insoluble in p-xylene at 25° C. in the propylene polymer composition; and CHIS: a component insoluble in n-heptane at 25° C. in the propylene polymer composition;

Requirement (3): at least one of a ratio of the number average molecular weight in terms of the polystyrene of the CXIS to a number average molecular weight in terms of polystyrene of the following CXS and a ratio of the number average molecular weight in terms of the polystyrene of the CHIS to a number average molecular weight in terms of polystyrene of the following CHS is 0.5 or more and 20 or less, CXS: a component dissolved in p-xylene at 25° C. in the propylene polymer composition; and CHS: a component dissolved in n-heptane at 25° C. in the propylene polymer composition;

Requirement (4): at least one of the number average molecular weight in terms of the polystyrene of the CXS and the number average molecular weight in terms of the polystyrene of the CHS is 120,000 or less; and Requirement (5): a content of ash in the propylene polymer composition is 1 to 5,000 wt. ppm.

2. The propylene polymer composition according to claim 1, wherein a content of the component (C) is 10 wt % or more with respect to a total weight of 100 wt % of the propylene polymer composition.

3. The propylene polymer composition according to claim 1, wherein the component (B) is an ethylene-propylene copolymer, and the segment (II) of the component (C) is an ethylene-propylene copolymer segment.

4. The propylene polymer composition according to claim 1, wherein the component (B) is an ethylene-α-olefin copolymer containing a structural unit derived from ethylene and a structural unit derived from an α-olefin having 4 to 10 carbon atoms, the segment (II) of the component (C) is an ethylene-α-olefin copolymer segment containing a structural unit derived from ethylene and a structural unit derived from an α-olefin having 4 to 10 carbon atoms, a number of short chain branches per 1,000 total carbon atoms of the ethylene-α-olefin copolymer is 10 to 200, and a number of short chain branches per 1,000 total carbon atoms of the ethylene-α-olefin copolymer segment is 10 to 200.

5. The propylene polymer composition according to claim 1, wherein the component (B) is a hydrogenated conjugated diene polymer, the segment (II) of the component (C) is a hydrogenated conjugated diene polymer segment, a number of short chain branches per 1,000 total carbon atoms of the hydrogenated conjugated diene polymer is 10 to 200, and a number of short chain branches per 1,000 total carbon atoms of the hydrogenated conjugated diene polymer segment is 10 to 200.

6. The propylene polymer composition according to claim 1, wherein a ratio of a weight average molecular weight in terms of polystyrene of the propylene polymer composition to a number average molecular weight in terms of the polystyrene of the propylene polymer composition is 1.5 or more and 3.0 or less.

7. The propylene polymer composition according to claim 2, wherein the component (B) is an ethylene-propylene copolymer, and the segment (II) of the component (C) is an ethylene-propylene copolymer segment.

8. The propylene polymer composition according to claim 2, wherein the component (B) is an ethylene-α-olefin copolymer containing a structural unit derived from ethylene and a structural unit derived from an α-olefin having 4 to 10 carbon atoms, the segment (II) of the component (C) is an ethylene-α-olefin copolymer segment containing a structural unit derived from ethylene and a structural unit derived from an α-olefin having 4 to 10 carbon atoms, a number of short chain branches per 1,000 total carbon atoms of the ethylene-α-olefin copolymer is 10 to 200, and a number of short chain branches per 1,000 total carbon atoms of the ethylene-α-olefin copolymer segment is 10 to 200.

9. The propylene polymer composition according to claim 2, wherein the component (B) is a hydrogenated conjugated diene polymer, the segment (II) of the component (C) is a hydrogenated conjugated diene polymer segment, a number of short chain branches per 1,000 total carbon atoms of the hydrogenated conjugated diene polymer is 10 to 200, and a number of short chain branches per 1,000 total carbon atoms of the hydrogenated conjugated diene polymer segment is 10 to 200.

10. The propylene polymer composition according to claim 2, wherein a ratio of a weight average molecular weight in terms of polystyrene of the propylene polymer composition to a number average molecular weight in terms of the polystyrene of the propylene polymer composition is 1.5 or more and 3.0 or less.

11. The propylene polymer composition according to claim 3, wherein a ratio of a weight average molecular weight in terms of polystyrene of the propylene polymer composition to a number average molecular weight in terms of the polystyrene of the propylene polymer composition is 1.5 or more and 3.0 or less.

12. The propylene polymer composition according to claim 4, wherein a ratio of a weight average molecular weight in terms of polystyrene of the propylene polymer composition to a number average molecular weight in terms of the polystyrene of the propylene polymer composition is 1.5 or more and 3.0 or less.

13. The propylene polymer composition according to claim 5, wherein a ratio of a weight average molecular weight in terms of polystyrene of the propylene polymer composition to a number average molecular weight in terms of the polystyrene of the propylene polymer composition is 1.5 or more and 3.0 or less.

* * * * *